US010738996B1

United States Patent
Roychoudhury et al.

(10) Patent No.: US 10,738,996 B1
(45) Date of Patent: *Aug. 11, 2020

(54) APPARATUS AND METHOD FOR OPERATING A GAS-FIRED BURNER ON LIQUID FUELS

(71) Applicant: Precision Combustion, Inc., North Haven, CT (US)

(72) Inventors: Subir Roychoudhury, Madison, CT (US); Richard Mastanduno, Milford, CT (US); Bruce Crowder, Hamden, CT (US); David Lang Spence, Beacon Falls, CT (US); Francesco Macri, Farmington, CT (US); Julian David Prada Bernal, Middletown, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/988,000

(22) Filed: May 24, 2018

Related U.S. Application Data

(63) Continuation-in-part of application No. 14/998,388, filed on Dec. 28, 2015, now Pat. No. 10,001,278.
(Continued)

(51) Int. Cl.
*F23N 1/02* (2006.01)
*F23K 5/00* (2006.01)
(Continued)

(52) U.S. Cl.
CPC .............. *F23K 5/002* (2013.01); *C01B 3/386* (2013.01); *F23K 5/10* (2013.01); *F23N 1/02* (2013.01);
(Continued)

(58) Field of Classification Search
CPC ... F23K 5/002; F23K 5/10; F23K 5/08; F23K 2900/05081; C01B 3/386;
(Continued)

(56) References Cited

U.S. PATENT DOCUMENTS

| 4,109,461 A | 8/1978 | Fujitani |
| 4,131,095 A | 12/1978 | Ouchi |

(Continued)

FOREIGN PATENT DOCUMENTS

| CA | 2267150 A1 | 9/2000 |
| WO | WO2004060546 A2 | 7/2004 |

(Continued)

OTHER PUBLICATIONS

S. Roychoudhury, D. Walsh, D. Chu, and E. Kalio, "Performance of a Diesel, JP-8 Reformer," Fuel Cell Seminar, Honolulu, Hawaii, Nov. 13-17, 2006.
(Continued)

*Primary Examiner* — Alfred Basichas
(74) *Attorney, Agent, or Firm* — Marie F. Zuckerman; Andrew D. Gathy

(57) ABSTRACT

A gas-fired burner adapted for use on a liquid fuel. A method for essentially smokeless start-up and steady state operation of a gas-fired burner on a liquid fuel. The apparatus integrates a catalytic liquid fuel reformer with a flame burner designed for operation on a gaseous fuel of high Wobbe Index, e.g., natural gas. The method involves reacting a mixture of a liquid fuel and oxidant in a catalytic reformer to obtain a gaseous reformate having a low Wobbe Index; and thereafter combusting the gaseous reformate, optionally augmented with liquid co-fuel and oxidant, in the gas-fired burner under diffusion flame conditions. The invention
(Continued)

allows commercial gas-fired appliances to be operated on a liquid fuel, thereby offering advantages in logistics and camp operations.

24 Claims, 5 Drawing Sheets

Related U.S. Application Data

(60) Provisional application No. 62/097,830, filed on Dec. 30, 2014.

(51) Int. Cl.
*F23N 3/08* (2006.01)
*F23K 5/10* (2006.01)
*C01B 3/38* (2006.01)

(52) U.S. Cl.
CPC ........ *F23N 3/08* (2013.01); *C01B 2203/0244* (2013.01); *C01B 2203/0261* (2013.01); *C01B 2203/1247* (2013.01); *C01B 2203/1276* (2013.01)

(58) Field of Classification Search
CPC .... C01B 2203/0244; C01B 2203/0261; C01B 2203/1247; C01B 2203/1276; F23N 1/02; F23N 3/08; F23N 1/00; F23N 3/00; F23D 17/002; F23D 5/126
See application file for complete search history.

(56) References Cited

U.S. PATENT DOCUMENTS

| | | | |
|---|---|---|---|
| 4,255,121 A | 3/1981 | Sugimoto |
| 4,302,177 A | 11/1981 | Fankhanel |
| 5,051,241 A | 9/1991 | Pfefferle |
| 5,947,063 A | 9/1999 | Smith |
| 6,156,444 A | 12/2000 | Smith |
| 6,746,657 B2 | 6/2004 | Castaldi |
| 6,869,456 B2 | 3/2005 | Salemi |
| 7,174,861 B2 | 2/2007 | Allston |
| 7,913,484 B2 | 3/2011 | Roychoudhury |
| 7,976,594 B2 | 7/2011 | Roychoudhury |
| 7,980,082 B2 | 7/2011 | Ziminsky |
| 8,387,380 B2 | 3/2013 | Roychoudhury |
| 8,439,990 B2 | 5/2013 | Roychoudhury |
| 8,479,508 B2 | 7/2013 | Roychoudhury |
| 8,557,189 B2 | 10/2013 | Roychoudhury |
| 8,795,398 B2 | 8/2014 | Roychoudhury |
| 9,903,585 B1 | 2/2018 | Crowder |
| 10,001,278 B1 * | 6/2018 | Roychoudhury ......... F23K 5/08 |
| 2005/0028445 A1 | 2/2005 | Roychoudhury |
| 2007/0037105 A1 | 2/2007 | Pfefferle |
| 2007/0084118 A1 | 4/2007 | Kaeding |
| 2007/0234735 A1 | 10/2007 | Mosbacher |
| 2009/0107105 A1 | 4/2009 | Ziminsky |
| 2009/0252661 A1 | 10/2009 | Roychoudhury |
| 2010/0126165 A1 | 3/2010 | Roychoudhury |
| 2011/0061299 A1 | 3/2011 | Roychoudhury |
| 2011/0079016 A1 | 4/2011 | Etemad |
| 2011/0165300 A1 | 7/2011 | Roychoudhury |
| 2013/0174485 A1 | 7/2013 | Roychoudhury |

FOREIGN PATENT DOCUMENTS

| | | |
|---|---|---|
| WO | WO2007098101 A2 | 8/2007 |
| WO | WO2012106048 A1 | 8/2012 |
| WO | WO2012141766 A1 | 10/2012 |

OTHER PUBLICATIONS

M. Castaldi, M. Lyubovsky, R. LaPierre, W. C. Pfefferle, and S. Roychoudhury, "Performance of Microlith Based Catalytic Reactors for an Isooctane Reforming System," SAE International, Publ. No. 2003-01-1366, Mar. 3, 2003.

Copending U.S. Appl. No. 14/826,263, filed Aug. 14, 2015, entitled "Spark-Ignited Internal Combustion Engine Modified for Multi-Fuel Operation," Inventors: S. Roychoudhury, R. Mastanduno, D. L. Spence, B. Crowder, and C. Morgan.

* cited by examiner

APPARATUS AND METHOD FOR OPERATING A GAS-FIRED BURNER ON LIQUID FUELS

CROSS REFERENCE TO RELATED APPLICATIONS

This application is a continuation-in-part of U.S. non-provisional patent application Ser. No. 14/998,388, filed Dec. 28, 2015, now allowed, which claims the benefit of U.S. provisional patent application No. 62/097,830, filed Dec. 30, 2014. The contents of the aforementioned patent applications are incorporated in their entirety herein by reference.

GOVERNMENT RIGHTS

This invention was made with support from the U.S. government, Department of Defense, under contract nos. W911QY-10-C-0025 and W911QY-13-P-0223 and W911QY-14-C-0099. The U.S. Government holds certain rights in this invention.

FIELD OF THE INVENTION

The present invention pertains to a burner system and a method for operating a gas-fired burner on a liquid fuel. More specifically, this invention pertains to an appliance incorporating the burner system, wherein a gas-fired burner is adapted for use with a liquid fuel.

BACKGROUND OF THE INVENTION

As known in the art, gas-fired burners are used for non-propulsion applications including residential, business, logistics, and camp purposes. As used herein, the term "logistics" refers to military and/or battlefield operations; while the term "camp" or "camping" refers to civilian operations at locations lacking a power grid, for example, recreational, marine, rescue, refugee, and emergency operations where a power grid is temporarily out of service or where no power grid exists. As used herein, the term "gas-fired burner" refers to a heat-producing burner that generates heat through flame combustion of a fuel existing in a gaseous state of matter at standard atmospheric temperature and pressure. Such gaseous fuels include methane, natural gas, ethane, propane, and butane. The gas-fired burner is further characterized as "static" in that it does not involve materially significant moving parts or reciprocating motion, in contrast to a burner employed for propulsion purposes, such as those found in internal combustion engines and gas turbines. Static gas-fired burners are employed in incinerators as well as in commercial appliances, such as stoves, ovens, ranges, grills, griddles, stock pot burners, clothes dryers, hot water heaters, boilers, and the like.

Static gas-fired burners of the type found in commercial appliances combust gaseous fuels, such as natural gas, methane, ethane, propane, or butane. A supply of the gaseous fuel is required to be available at the location of the appliance. Transportation of the gaseous fuel to the required location is burdensome and costly, particularly under logistics and camp operations. Moreover, under certain circumstances transportation of gaseous fuels is restricted. In contrast, liquid distillate fuels, such as diesel and JP-8, are readily available at essentially all locations, including remote logistics and camp operations, as preferred fuels for propulsion purposes, namely, for transportation vehicles. Moreover, liquid distillate fuels have an advantage of a higher energy density per unit volume and further advantages in being less volatile and safer to handle, as compared to gaseous fuels. Consequently, it would be desirable to operate static gas-fired burners and commercial appliances utilizing static gas-fired burners on a readily available liquid fuel, such as diesel or JP-8, so as to avoid transporting a gaseous fuel to the location of the burner or appliance.

One problem with the above concept involves the fact that gas-fired burners are designed for a specific gaseous fuel at a designated supply pressure to achieve a select energy output. Variations in any of fuel composition, or fuel supply pressure, or a ratio of fuel to air supplied to the burner can produce variations in energy output. In turn, variations in energy output, for example those greater than about +/-10 percent, can produce undesirable effects, for instance, thermal inefficiency and flame instability, the latter evidenced by a flickering yellow flame. In addition, ignition of the fuel may be hampered. For this reason gas-fired burners used in commercial appliances are designed for use with a particular Wobbe Index gaseous fuel and cannot be operated on gaseous fuels having a significantly different Wobbe Index.

The Wobbe Index ($I_w$) or Wobbe number is an indicator of the interchangeability of fuel gases and is calculated as shown in the equation below:

$$I_w = V_c/(G_s)^{1/2}$$

where $V_c$ is the heating value or calorific value of the gaseous fuel and $G_s$ is the specific gravity of the gaseous fuel. Industry typically calculates a Higher Wobbe Index using a higher heating or higher calorific value of the fuel, wherein the higher heating or higher calorific value is defined as the gross heat output on fully combusting the fuel to carbon dioxide and water. A Lower Wobbe Index is calculated using the lower heating or lower calorific value of the fuel, wherein the lower heating or lower calorific value is defined as the gross heat output minus the heat of vaporization of water. Unless otherwise specified, Wobbe Index values provided herein refer to the Higher Wobbe Index. Moreover, any reference hereinafter to "low" or "high" Wobbe Index refers to relative numerical values of the Higher Wobbe Index. The specific gravity of the gaseous fuel is defined as a ratio of the density of the gaseous fuel compared to the density of a reference substance, specifically, the density of air, taken as 1.2 g/cm$^3$ as measured at 20° C. and 101 kPa. The Wobbe Index is commonly expressed in British thermal units per normal cubic foot (BTU/scf) or megajoules per normal cubic meter (MJ/Nm$^3$); and in this sense can be considered a measure of energy density. Typically, the Wobbe Index is not applicable to liquid fuels.

The Wobbe Index for natural gas generally ranges from 1,250 to 1,440 BTU/scf (44.6-53.6 MJ/Nm$^3$); whereas typical Wobbe Indices for propane and butane are respectively about 1,882 BTU/scf (70.1 MJ/Nm$^3$) and 2,251 BTU/scf (83.8 MJ/Nm$^3$). Gaseous fuels having a Wobbe Index outside these ranges cannot be easily substituted for the aforementioned specified fuel without burdensome design modifications to the burner. By manner of explanation, burners configured for commercial appliances are typically designed for a fuel of specific Wobbe Index, for example, the Wobbe Index of natural gas. In a "partially-aerated" burner the natural gas is pre-mixed with a gaseous oxidant, such as air, and fed at an acceptable velocity to an orifice of the burner, where the mixture is ignited and burned as in a premixed diffusion flame combustion. Substituting a gaseous fuel having a lower Wobbe Index for natural gas results in a lower thermal input (or lower "firing rate") into the appliance, proportional to a ratio of the two Wobbe Indices (i.e., ratio of the Wobbe Index of the gaseous fuel substitute to the Wobbe Index of natural gas). In order to compensate for the lower firing rate, the diameter of the orifice can be modified to allow more flow for a given pressure. This modification will increase the volumetric flow of fuel through the system and allow a higher firing rate with the lower Wobbe Index fuel. Partially-aerated burners typically include shutters to allow adjustment of premix flow into the burner orifice, which provides for some interchangeability of fuels of similar Wobbe Index, such as from natural gas to propane. The resulting flame, with appropriate level of premix (typically, 25-50 percent of air required for stoichiometric reaction), then with the appropriate addition of secondary air via diffusion at the orifice of the burner (resulting in total air flow of 40-80 percent in excess of stoichiometric) will result in a stable and clean (i.e., low emission, low particulate) flame. Disadvantageously, gaseous fuels with a very low Wobbe Index, for example, below 1,000 BTU/scf (<37.3 MJ/Nm$^3$) cannot be accommodated with the typical levels of adjustability built into commercial burners. Significantly higher velocities through the burner inlet entrain significantly higher quantities of air, which causes a lean condition. The resulting flame is highly unstable and difficult to ignite.

As a further disadvantage, a gas-fired burner cannot be operated directly on a liquid fuel. Transport and combustion of liquid fuels require entirely different design mechanisms from those used with gaseous fuels. To be specific, liquid fuels are susceptible to gravitational factors, require vaporization prior to mixing with air, and may be chemically incompatible with seals and other materials inside the appliance. As another disadvantage, during start-up when a flame and burner parts are cold, a liquid fuel is prone to incomplete combustion, which in turn produces smoking and hydrocarbon emissions. Smoking tends to decrease as a burner flame and parts warm-up and substantially diminishes when the burner is operating properly at steady-state conditions. Smoking and hydrocarbon emissions are highly undesirable at any point of operation, especially during a cold start-up, and even more so when the burner is intended for use in cooking appliances, such as an oven.

U.S. Pat. Nos. 7,976,594 and 8,795,398 disclose an apparatus and method for reforming a liquid distillate fuel, such as kerosene, diesel, and JP-8. The apparatus comprises an ultra-short-channel-length metal substrate provided in a coiled configuration having a radial flow path from an inner diameter to an outer diameter. Supplies of liquid fuel and oxidant, typically air, are taught to be contacted with the coiled substrate; and catalytic partial oxidation (CPOX) occurs therein to produce a gaseous reformate comprising hydrogen and carbon monoxide.

U.S. Pat. Nos. 7,913,484 and 8,387,380 disclose a catalytic burner comprising an ultra-short-channel-length metal mesh substrate. The burner is taught to be employed for full combustion of a liquid distillate fuel to produce thermal energy, which is captured as heat in the head of a Stirling engine.

Patent application publication US 2011/0165300A1 discloses a cooking appliance constructed with a catalytic burner comprised of an ultra-short-channel-length metal substrate, which is conductively contacted by means of a heat spreader to a heat conductive surface. The burner is operated under full combustion conditions to produce thermal energy, which is captured on the conductive surface for cooking applications.

The art would benefit from discovery of an apparatus and a method of operating a gas-fired burner, for example, a natural gas-fired burner, on a liquid fuel, such as those liquid distillate fuels used for propulsion purposes. Such a method should provide for an essentially smokeless start-up from cold conditions. With such a discovery, the burden and cost of transporting two fuels, i.e., a liquid propulsion fuel and a non-propulsion gaseous fuel, to remote locations would be avoided. Only one liquid fuel would be provided for both propulsion and non-propulsion applications; and the gaseous fuels commonly used in static gas-fired burners would be employed as a matter of choice, rather than necessity. The benefits would be particularly advantageous in logistics and camp operations. Moreover, an essentially smokeless start-up would render the apparatus and method suitable for cooking applications, where smoking and release of hydrocarbon emissions are highly unacceptable.

SUMMARY OF THE INVENTION

We have now discovered unexpectedly that a low Wobbe Index gaseous fuel, prepared by reforming a liquid fuel into a gaseous reformate comprising hydrogen, can be employed to fire a gas-fired burner configured for a high Wobbe Index fuel, even as oxidant flow is reduced and fuel supply pressure is maintained at an acceptable level for the burner design. The discovery resides in coupling a liquid fuel reformer to the gas-fired burner through a connecting member of specific design.

In one embodiment, this invention provides a burner system comprising:
  (a) a reformer configured under operative conditions to exhaust a gaseous reformate having a Wobbe Index greater than about 145 BTU/scf (5.4 MJ/Nm$^3$) and less than about 700 BTU/scf (20.0 MJ/Nm$^3$), comprising:
    (i) a housing defining a reforming chamber;
    (ii) a first inlet configured to input a liquid fuel into the reforming chamber;
    (iii) a second inlet configured to input an oxidant into the reforming chamber;
    (iv) a mesh substrate having one or more catalytic metals supported thereon, the mesh substrate being disposed within the reforming chamber and fluidly coupled to the first and second inlets for inputting the fuel and oxidant, respectively; and
    (v) an outlet for exhausting a reformate from the reforming chamber, the outlet being fluidly coupled to the mesh substrate;
  (b) a connecting member comprising an inlet end and an outlet end, wherein the inlet end of the connecting member is fluidly coupled to the outlet of the reformer, and wherein the outlet end of the connecting member is fluidly coupled to an inlet of a gas-fired burner; and
  (c) the gas-fired burner configured to operate with a gaseous fuel having a Wobbe Index in a range from about 1,250 BTU/scf (46.6 MJ/Nm$^3$) to about 2,300 BTU/scf (85.7 MJ/Nm$^3$), the burner comprising;
    (i) the inlet fluidly coupled to the outlet end of the connecting member; and
    (ii) one or more orifices downstream of the burner inlet, the orifices configured to support flame combustion.

In another embodiment of the burner system of this invention, the connecting member is configured to transmit the gaseous reformate directly to the gas-fired burner with exclusion of co-fueling additional fuel and oxidant to the burner. In this embodiment, the connecting member excludes any inlet except for the aforesaid inlet coupled to the outlet of the reformer. Moreover, any oxidant inlet that provides oxidant premix with the reformed fuel (reformate), in advance of the burner orifice, is closed off. Operationally, this design involves feeding the gaseous reformate directly into one or more orifices of the burner in absence of premixed oxidant; and thereafter, allowing combustion to occur under non-premixed diffusion flame conditions. Normally the burner would not function without a premixed inlet stream, or would function poorly with high emissions or unstable flames (the flames would lift off the burner tubes typically) due to a low flame speed of typical appliance fuel/gas mixtures. Surprisingly, we have discovered that the Low Wobbe reformate exhibited a stable, well attached, easily ignited, and low-emission flame under non-premixed diffusion flame conditions.

In another embodiment, the connecting member is outfitted with the inlet end for receiving the gaseous reformate, a first auxiliary inlet for feeding into the connecting member a supply of liquid co-fuel, a second auxiliary inlet for feeding into the connecting member a supply of oxidant, and the outlet end for transporting a mixture of gaseous reformate, vaporized liquid co-fuel, and oxidant to the burner. In this design, the connecting member further comprises a mesh extending transversely across the first auxiliary inlet, which functions to disperse the liquid co-fuel and facilitate its vaporization. Operationally, the mixture of gaseous reformate, vaporized liquid co-fuel, and additional oxidant are fed to the burner, ignited, and combusted in a pre-mixed diffusion flame combustion at one or more orifices of the burner.

In another embodiment of this invention, the one or more orifices of the burner are not enclosed within a burner housing, but rather the orifices open to ambient environs so as to provide an unenclosed flame. In this embodiment, ambient air is provided as a supply of oxidant setting up a diffusion flame combustion zone at the one or more orifices of the burner.

In another embodiment, the one or more orifices of the burner are enclosed within a burner housing. In this embodiment, the burner housing further comprises an inlet configured to input a supply of oxidant to a flame combustion zone at the one or more orifices; and the burner housing further comprises an outlet configured to exhaust combustion products from within the housing.

It should be appreciated that commercial gas-fired burners may employ plastic parts at or around the gaseous fuel and oxidant inlets. These plastic parts may not be sufficiently heat resistant to withstand contact with hot reformate exiting the liquid fuel reformer. Accordingly, in the novel burner system of this invention any plastic part(s) present in the burner as purchased can be removed and replaced with one or more heat resistant metal parts. As an alternative to replacing burner parts, the burner system of this invention may further comprise a heat exchanger configured to cool the gaseous reformate exiting the reformer prior to entry into the burner. Accordingly, in this alternative embodiment, the connecting member is integrated into a heat exchanger configured in such a manner that heat in the reformate is transferred to a heat exchange fluid, thereby cooling the reformate before it enters the burner.

In another aspect, the mesh substrate in any of the aforementioned embodiments is provided as a metal mesh or a ceramic mesh substrate. In another embodiment, the mesh substrate is provided in a coiled configuration having an inner diameter and an outer diameter and a radial flow path from the inner diameter to the outer diameter. In yet another aspect, the mesh substrate in any of the aforementioned embodiments is provided in a planar perforated sheet or a stack of planar perforated sheets.

In still another aspect, this invention provides for a first method of operating a gas-fired burner on a liquid fuel, the process comprising:
(a) feeding a supply of liquid fuel and a supply of oxidant into a reformer in a fuel-rich fuel/oxidant ratio, the reformer comprising a mesh substrate having one or more catalytic elements supported thereon;
(b) contacting the supply of oxidant and the supply of liquid fuel with the mesh substrate having one or more catalytic elements supported thereon, under reaction conditions sufficient to produce a gaseous reformate comprising hydrogen, the gaseous reformate having a Wobbe Index greater than about 145 BTU/scf (5.4 MJ/Nm$^3$) and less than about 700 BTU/scf (26.0 MJ/Nm$^3$);
(c) feeding the gaseous reformate into an inlet of the gas-fired burner in absence of premixed oxidant, the burner configured to receive a gaseous fuel having a Wobbe Index ranging from about 1,250 BTU/scf (46.6 MJ/Nm$^3$) to about 2,300 BTU/scf (85.7 MJ/Nm$^3$); and
(d) at one or more orifices of the burner, igniting the gaseous reformate under non-premixed diffusion flame combustion conditions so as to produce a combustion product stream.

In another aspect, this invention provides for a second method of operating a gas-fired burner on a liquid fuel, the process comprising:
(a) feeding a liquid fuel and a first supply of oxidant into a reformer in a fuel-rich fuel/oxidant ratio, the reformer comprising a mesh substrate having one or more catalytic elements supported thereon;
(b) contacting the liquid fuel and the first supply of oxidant with the mesh substrate having one or more catalytic elements supported thereon, under reaction conditions sufficient to produce a gaseous reformate comprising hydrogen, the gaseous reformate having a Wobbe Index greater than about 145 BTU/scf (5.4 MJ/Nm$^3$) and less than about 700 BTU/scf (26.0 MJ/Nm$^3$);
(c) feeding the gaseous reformate, a liquid co-fuel, and a second supply of oxidant into a connecting member wherein the liquid co-fuel is vaporized;
(d) transmitting a resulting mixture comprising the gaseous reformate, the vaporized liquid co-fuel, and the second supply of oxidant into a gas-fired burner, the burner configured to receive a gaseous fuel having a Wobbe Index in a range from about 1,250 BTU/scf (46.6 MJ/Nm$^3$) to about 2,300 BTU/scf (85.7 MJ/Nm$^3$); and
(e) at one or more orifices of the gas-fired burner, igniting the mixture comprising the gaseous reformate, the vaporized liquid co-fuel, and the second supply of oxidant under diffusion flame conditions sufficient to produce a combustion product stream.

In another embodiment, this invention provides for a method of starting-up a gas-fired burner on a liquid fuel, comprising:
(a) feeding a liquid fuel and a first supply of oxidant into a reformer in a fuel-rich fuel/oxidant ratio, the reformer comprising a mesh substrate having one or more catalytic elements supported thereon;
(b) contacting the liquid fuel and the first supply of oxidant with the mesh substrate having one or more catalytic elements supported thereon, under reaction conditions sufficient to produce a flow of a gaseous reformate comprising hydrogen, the gaseous reformate having a Wobbe Index greater than about 145 BTU/scf (5.4 MJ/Nm$^3$) and less than about 700 BTU/scf (26.0 MJ/Nm$^3$);

(c) feeding into a connecting member the flow of the gaseous reformate and a second supply of oxidant in a lean ratio of reformate to the second supply of oxidant, and energizing an ignition source within the connecting member to initiate combustion of the reformate therein;

(d) passing combustion products from step (c) from the connecting member into a gas-fired burner configured to receive a gaseous fuel having a Wobbe Index in a range from about 1,250 BTU/scf (46.6 MJ/Nm$^3$) to about 2,300 BTU/scf (85.7 MJ/Nm$^3$) and exhausting the combustion products at one or more orifices of the gas-fired burner; and (e) at a predetermined temperature or time, diminishing the second supply of oxidant.

The aforementioned method of starting-up the gas-fired burner on a liquid fuel advantageously provides for an essentially smokeless start-up from cold conditions.

In a related embodiment, this invention provides for a method of operating a gas-fired burner on a liquid fuel from an essentially smokeless start-up:

(a) feeding a liquid fuel and a first supply of oxidant into a reformer in a fuel-rich fuel/oxidant ratio, the reformer comprising a mesh substrate having one or more catalytic elements supported thereon;

(b) contacting the liquid fuel and the first supply of oxidant with the mesh substrate having one or more catalytic elements supported thereon, under reaction conditions sufficient to produce a flow of a gaseous reformate comprising hydrogen, the gaseous reformate having a Wobbe Index greater than about 145 BTU/scf (5.4 MJ/Nm$^3$) and less than about 700 BTU/scf (26.0 MJ/Nm$^3$);

(c) feeding into a connecting member the flow of the gaseous reformate and a second supply of oxidant in a lean ratio of reformate to second supply of oxidant, and energizing an ignition source within the connecting member to initiate combustion of the reformate therein;

(d) passing combustion products from step (c) from the connecting member into a gas-fired burner configured to receive a gaseous fuel having a Wobbe Index in a range from about 1,250 BTU/scf (46.6 MJ/Nm$^3$) to about 2,300 BTU/scf (85.7 MJ/Nm$^3$) and exhausting the combustion products at one or more orifices of the gas-fired burner;

(e) at a predetermined temperature or time, diminishing the second supply of oxidant; and (f) passing a continuing flow of gaseous reformate from the reformer through the connecting member into the gas-fired burner; and at one or more orifices of the gas-fired burner, combusting the reformate under diffusion flame conditions.

In another embodiment, this invention provides for a cooking appliance, preferably, an oven, having as a constituent part a gas-fired burner adapted for use with a liquid fuel. The cooking appliance comprises:

(a) a reformer configured under operative conditions to exhaust a gaseous reformate having a Wobbe Index greater than about 145 BTU/scf (5.4 MJ/Nm$^3$) and less than about 700 BTU/scf (20.0 MJ/Nm$^3$), comprising:
 (i) a housing defining a reforming chamber;
 (ii) a first inlet configured to input a liquid fuel into the reforming chamber;
 (iii) a second inlet configured to input an oxidant into the reforming chamber;
 (iv) a mesh substrate having one or more catalytic metals supported thereon, the mesh substrate being disposed within the reforming chamber and fluidly coupled to the first and second inlets for inputting the fuel and oxidant, respectively; and
 (v) an outlet for exhausting a reformate from the reforming chamber, the outlet being fluidly coupled to the mesh substrate;

(b) a connecting member comprising an inlet end and an outlet end, wherein the inlet end of the connecting member is fluidly coupled to the outlet of the reformer, and wherein the outlet end of the connecting member is fluidly coupled to an inlet of a gas-fired burner; and (c) the gas-fired burner configured to operate with a gaseous fuel having a Wobbe Index in a range from about 1,250 BTU/scf (46.6 MJ/Nm$^3$) to about 2,300 BTU/scf (85.7 MJ/Nm$^3$), the burner comprising;
 (i) the inlet fluidly coupled to the outlet end of the connecting member; and
 (ii) one or more orifices downstream of the burner inlet, the orifices configured to support flame combustion.

It is known that hydrogen has a high flame speed of up to 2.8 meters per second (2.8 m/s) versus 0.3 m/s for natural gas; yet for many reasons hydrogen is not typically used in appliances. Bottled hydrogen is more expensive and less safe to handle, as compared with bottled natural gas or propane. The present inventors appreciated, however, that a high flame speed gas, like that of hydrogen, allows flames to be well anchored (stable) in a diffusion flame mode. (The term "diffusion flame" means that a balance of air or oxidant required for complete combustion of the fuel stream is obtained via diffusion from ambient environs at the orifice(s) of the burner.) The reformer in this invention converts the liquid fuel into a high flame speed mixture by partial oxidation of the liquid fuel into a gaseous reformate comprising hydrogen and carbon monoxide, which in this invention is fed into the gas-fired burner providing for advantageous flame stabilization and in some embodiments increased fuel energy density. Thus, in this invention a gaseous reformate having a low Wobbe Index, optionally augmented with a supply of liquid co-fuel, is unexpectedly and advantageously substituted for a gaseous fuel having a high Wobbe Index, in conventional gas-fired burners designed to operate on the high Wobbe gaseous fuel. Advantageously, commercial appliances employing the conventional gas-fired burner can be operated on a liquid fuel without burdensome design modifications to the burner.

As a further advantage, the method of this invention of operating the gas-fired burner on liquid fuels occurs in a clean and essentially smokeless manner from cold start at ambient temperatures through to steady-state operation at elevated flame temperatures.

DRAWINGS

DETAILED DESCRIPTION OF THE INVENTION

Figure 1:
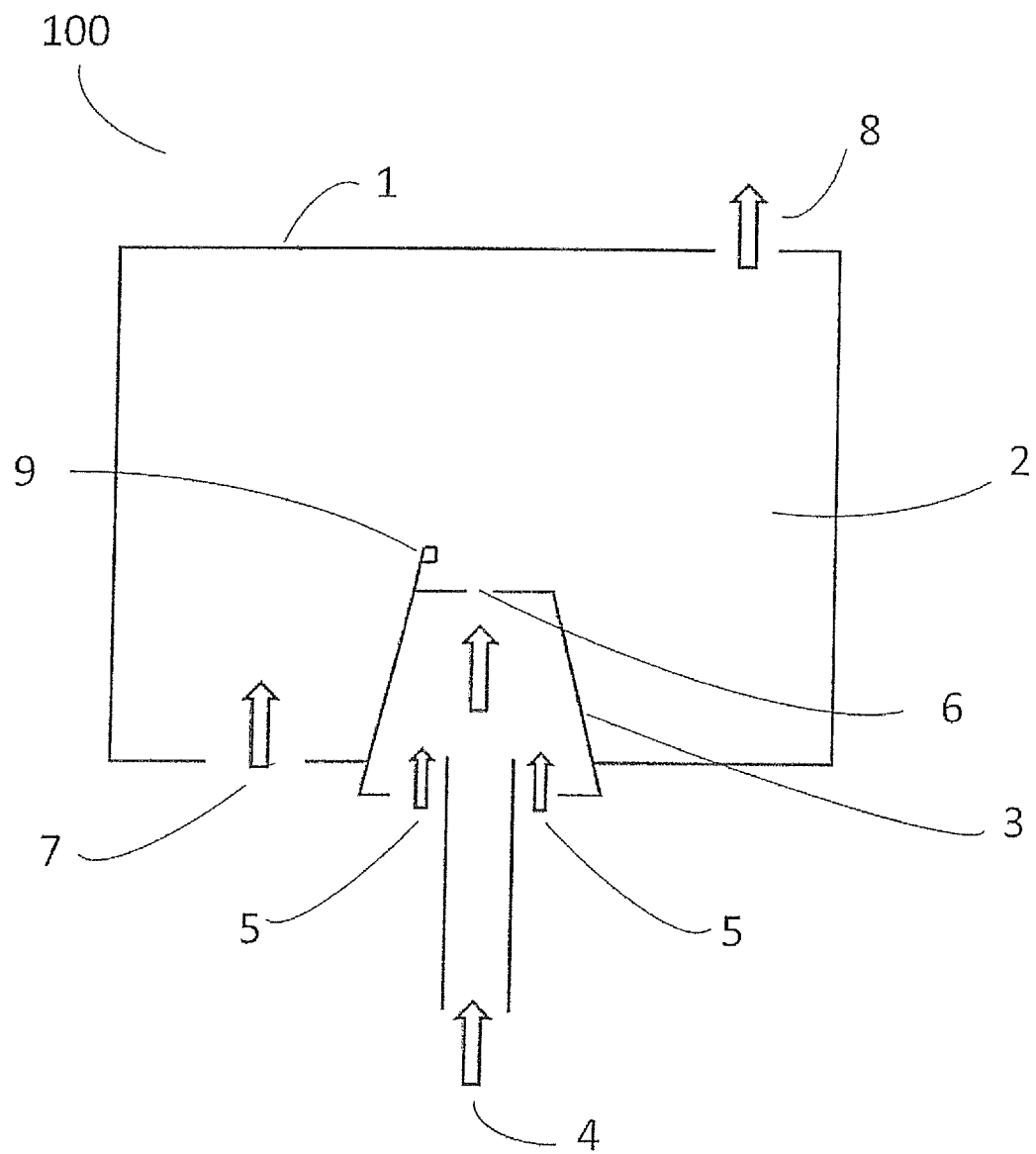
FIG. 1 illustrates a conventional prior art gas-fired burner.

FIG. 1 illustrates a prior art natural gas-fired burner system 100 typically found in a small appliance, such as a stove, oven, range, grill, griddle, stock pot burner, clothes dryer, hot water heater, or boiler. As seen, burner system 100 is adapted with a housing 1, a combustion chamber 2, a burner 3, an inlet 4 for feeding a supply of natural gas to burner 3, and one or more inlets 5 for feeding a supply of air to burner 3 for premixing with the fuel. Within the burner the premixed flow of fuel and air is provided generally in a fuel to air ratio greater than a stoichiometric ratio (>1/1), wherein the term "stoichiometric" refers to the ratio (1/1) at which air is provided in an exact amount so as to combust all of the fuel to a mixture of carbon dioxide and water. At a fuel/air ratio greater than stoichiometric (>1/1), typically employing only about 25 to 50 percent of air needed for full combustion, the premixed flow of fuel and air is considered "fuel-rich" and the burner is considered to be "partially-aerated". The fuel-air premixture is ignited in burner 3 at orifice 6 by means of igniter 9. As the combustion requires additional air for completion, it is provided via one or more air inlets 7 provided in housing 1, feeding air into combustion chamber 2. A combustion product stream exhausts chamber 2 via exhaust outlet 8.

Typically, natural gas has a Wobbe Index of between 1,250 to 1,440 BTU/scf (44.6 to 53.6 MJ/Nm$^3$). In contrast, we recognized that a stoichiometric mixture of natural gas and air has a Wobbe Index of only about 135 BTU/scf (5.0 MJ/Nm$^3$), the air reducing the inherent energy density of the fuel by a full order of magnitude. Nevertheless, it was discovered that despite the lower Wobbe Index of the stoichiometric mixture of natural gas and air, the mixture produces upon combustion a stable blue flame. We further recognized that the Wobbe Index of a gaseous reformate comprising hydrogen and carbon monoxide diluted with nitrogen, but absent oxygen, is about 200 BTU/scf (7.5 MJ/Nm$^3$), which lies far below the Wobbe Index of natural gas alone but closer to the Wobbe Index of a stoichiometric mixture of premixed natural gas and air. It should be appreciated that the lower Wobbe Index of the reformate results from its different chemical composition as compared with natural gas and a dilution factor from the presence of nitrogen.

We further observed that when a reformate comprising hydrogen, carbon monoxide, and nitrogen is premixed with additional air for combustion, a stable flame cannot be supported at the burner head in a burner designed for natural gas. We postulated that the Wobbe Index of the premixed mixture of reformate and air fell too far below the operational Wobbe range of the burner, although such a theory is not to be limiting of this invention. Thus, it was expected that a low Wobbe gaseous reformate could not be substituted for a high Wobbe natural gas in a small gas-fired burner. Subsequently, we unexpectedly discovered the apparatus and method described herein, wherein a low Wobbe Index gaseous reformate is substituted successfully for a high Wobbe Index gaseous fuel in an existing gas-fired burner, in one instance when the reformate is not premixed with oxidant. In another instance, the reformate is augmented with liquid fuel and premixed with oxidant to achieve stable operation of the gas-fired burner.

We inventors further discovered that the Wobbe Index alone does not provide sufficient insight regarding other important combustion properties, such as flame speed, flame stability, and diffusivity, upon which the operability of combustion systems strongly depends. We postulate that hydrogen in a gaseous reformate provides a high flame speed and a high diffusivity that compensates for the low Wobbe Index of the reformate, yielding a stable blue flame in the apparatus of the invention. The invention makes it possible to reform a liquid fuel under partial oxidation conditions with air or essentially pure oxygen into a gaseous reformate of specific Wobbe Index and comprising hydrogen, and to substitute the gaseous reformate for natural gas or other gaseous fuels for stable operation in a small gas-fired burner.

Figure 2:
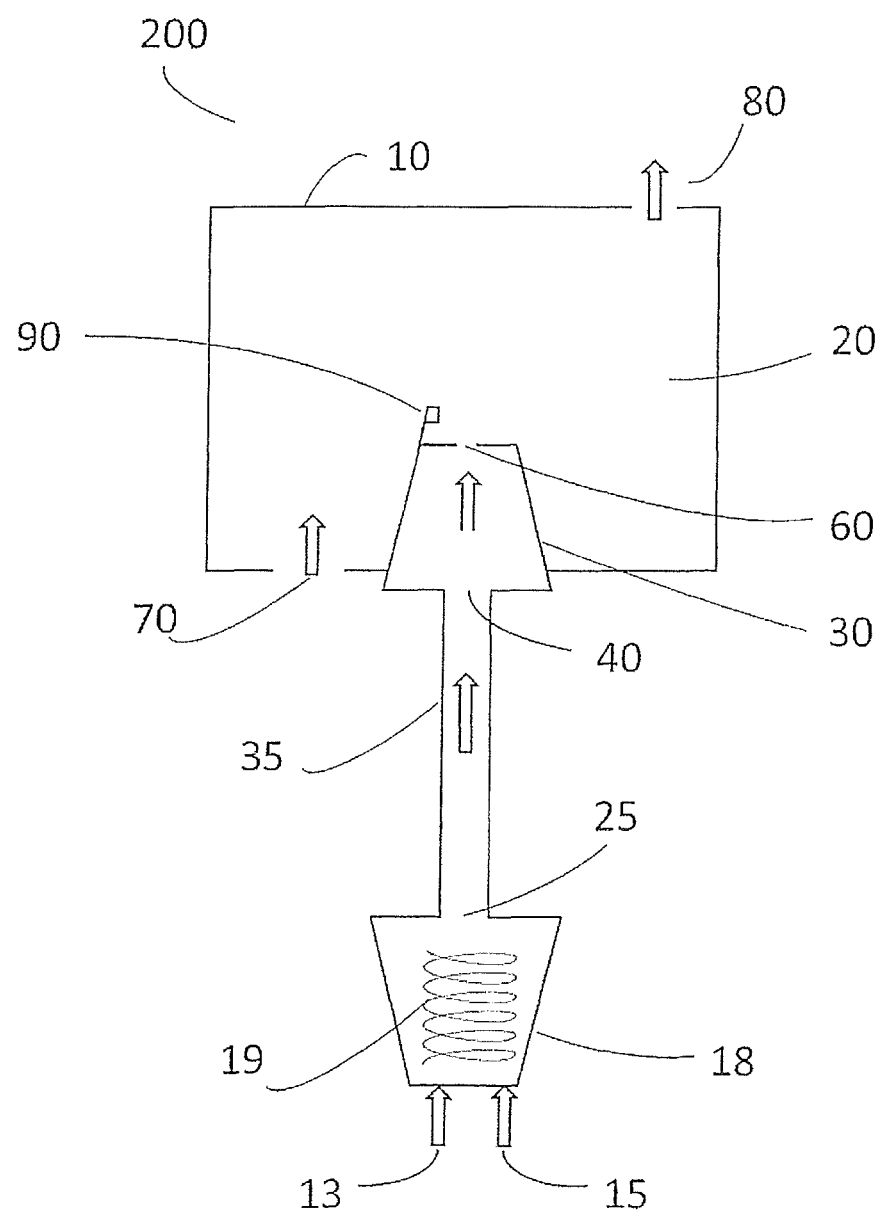
FIG. 2 illustrates an embodiment of an apparatus of this invention comprising a gas-fired burner coupled to a reformer for operation on a liquid fuel.

Accordingly, FIG. 2 illustrates an embodiment of an apparatus of the invention comprising a gas-fired burner system 200, which can be integrated into a small commercial appliance and operated on a liquid fuel. As seen, burner system 200 is adapted with a reformer 18, a gas-fired burner 30, a burner housing 10, and a combustion chamber 20. The reformer 18 is comprised of an inlet 13 for feeding a supply of liquid fuel into reformer 18, an inlet 15 for feeding a supply of an oxidant into reformer 18, a mesh substrate 19 positioned within the reformer and having one or more catalytic elements supported thereon, and an outlet 25 for exhausting a gaseous reformate stream therefrom. Burner system 200 further comprises burner 30 secured to the burner housing 10, the burner 30 comprising an inlet 40 for receiving the gaseous reformate and an orifice 60 opening into combustion chamber 20. Under operating conditions, a flame is present at orifice 60. Burner 30 is coupled via connecting member 35 to reformer 18, such that outlet 25 of the reformer 18 is fluidly connected at an inlet end to connecting member 35, which member is also fluidly connected at its outlet end to inlet 40 of burner 30. Combustion chamber 20 further comprises an inlet 70 for feeding a supply of oxidant into the combustion chamber 20 and an outlet 80 for exhausting a combustion product stream. In FIG. 2 it is noted that other than inlet 40, burner 30 does not contain any other inlet for inputting a supply of oxidant or fuel. Likewise, connecting member 35, which fluidly connects reformer 18 to burner 30, also excludes an inlet for inputting additional oxidant and/or fuel.

The flows of liquid fuel and air are provided to the reformer in a fuel-rich fuel to oxidant ratio, such that there is a deficit of oxidant and therefore only partial combustion of the fuel. A gaseous reformate comprising hydrogen and carbon monoxide exits reformer 18 and is fully combusted in the combustion chamber 20 to carbon dioxide and water. Full combustion requires a make-up oxidant to complete the combustion, which is provided via inlet 70. The reformate-air mixture is ignited via ignition device 90 and combusted at orifice 60 of burner 30 in a non-premixed diffusion flame. As illustrated in FIG. 2, the ignition device 90 is secured to burner 30 in close proximity to orifice 60. A combustion product stream exhausts the combustion chamber 20 via outlet 80.

Figure 3:
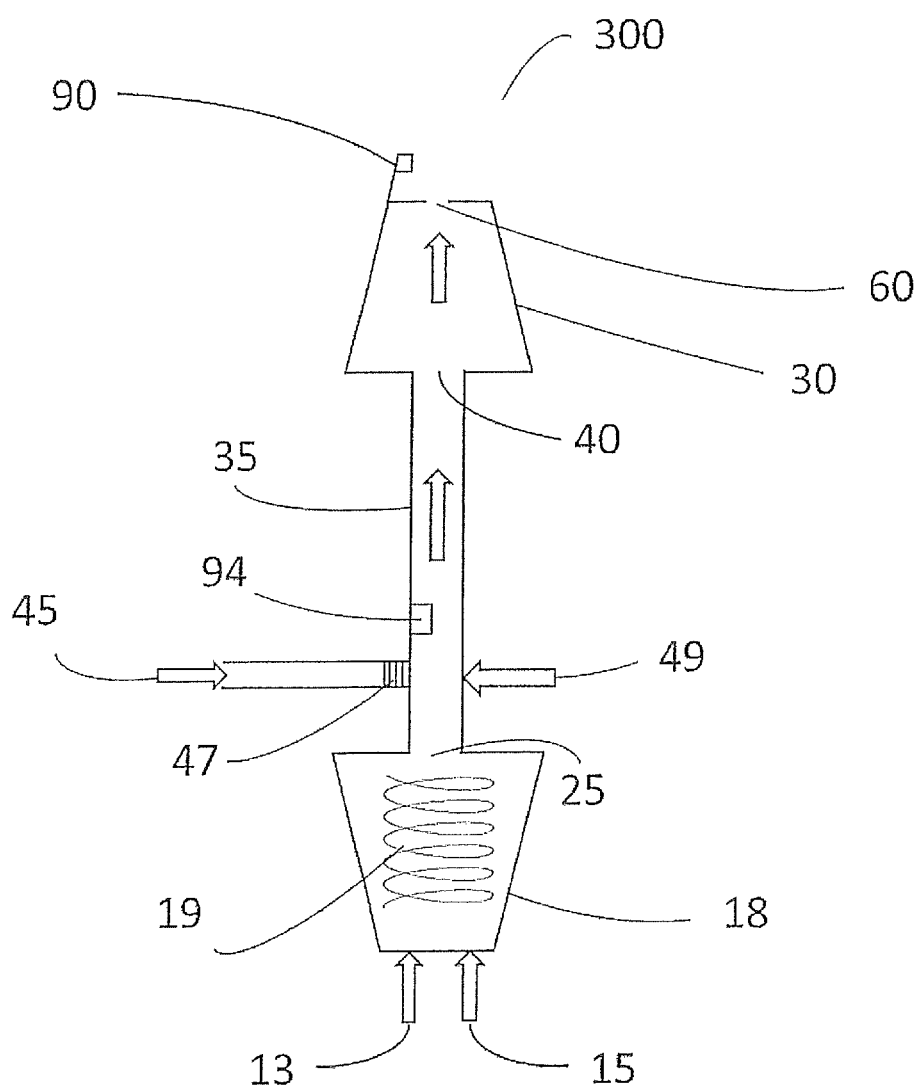
FIG. 3 illustrates another embodiment of an apparatus of this invention comprising a gas-fired burner coupled to a reformer for operation on a liquid fuel.

Another embodiment of an apparatus of this invention is envisioned in FIG. 3, as illustrated in burner system 300. As seen, burner system 300 combines a gas-fired burner 30 with a reformer 18. Reformer 18 is comprised of an inlet 13 for feeding a supply of liquid fuel and an inlet 15 for feeding a supply of an oxidant into reformer 18, a mesh substrate 19 disposed within the reformer and having one or more catalytic elements supported thereon, and an outlet 25 for exhausting a gaseous reformate therefrom. Burner system 300 further comprises a gas-fired burner 30 comprising an inlet 40 for receiving the gaseous reformate and an orifice 60 at which flame combustion occurs. Burner 30 is coupled via connecting member 35 to reformer 18, such that outlet 25 of reformer 18 is fluidly connected to connecting member 35 through its inlet end, and inlet 40 of burner 30 is fluidly connected to connecting member 35 through its outlet end. Connecting member 35 further comprises a first auxiliary inlet 45 for feeding a liquid co-fuel, a second auxiliary inlet 49 for feeding additional oxidant, and a supplementary igniter 94 within connecting member 35 disposed in close proximity to the first and second auxiliary inlets 45 and 49. The first auxiliary inlet 45 is further configured with a heat-conductive mesh or screen 47 disposed transversely across the flow path of inlet 45 at intersection with connecting member 35. The mesh 47 functions to disperse the liquid co-fuel over a larger surface area and thereby facilitate its vaporization.

Further with respect to FIG. 3, under operative conditions flows of liquid fuel and air are provided to reformer 18 in a fuel-rich fuel to oxidant ratio, as noted hereinbefore. A gaseous reformate comprising hydrogen and typically carbon monoxide exits reformer 18 passing into connecting member 35, where the reformate is mixed with vaporized liquid co-fuel and additional oxidant fed through auxiliary inlets 45 and 49, respectively. In one operative embodiment, the resulting mixture of the reformate, vaporized liquid co-fuel, and additional oxidant are ignited in flame combustion via igniter 90 at orifice 60 of burner 30. Full combustion requires a make-up oxidant to complete the combustion, which is provided via inlet 49 as well as by diffusion of ambient air around orifice 60. In another operative embodiment, the mixture of reformate, vaporized liquid co-fuel and additional oxidant are ignited via auto-ignition or via supplementary igniter 94 in a flame combustion within connecting member 35. In this embodiment, the connecting member 35 may further comprise a restriction to hold the flame. The combustion is finished off at orifice 60 of the burner, with the make-up oxidant derived from ambient environs. In both operative embodiments, a combustion product stream exhausts directly to ambient environs. Although not shown in FIG. 3, the burner 30 may be enclosed within a housing of the type illustrated in FIG. 2 (10).

The fuel supplied to the reformer comprises any liquid fuel derived from petroleum fossil fuels, biomass, or synthetic fuel sources. Preferred is a liquid distillate fuel. Normally, the distillate fuel is found in a liquid state within a temperature range from about −45° C. to about +140° C. at 1 atmosphere pressure. The boiling point or distillation point is fuel specific, but typically ranges from about 160° C. to about 350° C. In one embodiment, the fuel consists essentially of a single hydrocarbon component; in another embodiment, the fuel comprises a complex mixture of paraffinic, cycloaliphatic, and aromatic hydrocarbons as known in the art. Suitable liquid fuels supplied to the reformer include, without limitation, gasoline, diesel, kerosene, JP-8, JP-10, and Jet-A, as well as biodiesel, such as ethanol and butanol, and liquid hydrocarbon fuels obtained from synthetic sources including Fisher-Tropsch processes. Preferred liquid distillate fuels include diesel, kerosene, JP-8, JP-10, Jet A, and mixtures thereof.

The oxidant supplied to the reformer comprises any chemical capable of partially oxidizing the liquid fuel selectively to hydrogen and other partially oxidized products, for example, carbon monoxide. (A mixture of hydrogen and carbon monoxide is recognized as "syngas".) Suitable oxidants include, without limitation, molecular oxygen, mixtures of oxygen and nitrogen including air, and mixtures of oxygen and one or more inert gases, such helium and argon. In most applications, air is the preferred oxidant.

The liquid fuel and oxidant are provided to the reformer in a "fuel-rich" ratio such that there is insufficient amount of oxidant to convert all of the fuel to complete oxidation products, namely, carbon dioxide and water. Viewed another way, the quantities of liquid fuel and oxidant are best described in terms of an O:C ratio, wherein "O" refers to atoms of oxygen in the oxidant and "C" refers to atoms of carbon in the liquid fuel. Generally, the O:C ratio of the oxidant-fuel mixture fed to the reformer is greater than about 0.5:1 and less than about 1.1:1, the precise range being dependent upon the liquid fuel employed.

The reforming aspect of this invention desirably involves "dry reforming," wherein the liquid fuel and oxidant are contacted in the absence of external co-fed water and/or steam. In this instance, the term "external co-fed water and/or steam" refers to importing and co-feeding a supply of water or steam into the reformer from an external source, e.g., water tank, steam generator, steam vaporizer, or some combination thereof. While the invention does not prohibit co-feeding water and/or steam to the reforming process, and while reformate yields are often enhanced by the addition of co-fed water or steam, in the present application co-feeding water and/or steam might present certain disadvantages. For one, providing a supply tank of water or a water vaporizer or steam generator would be burdensome or less practical in logistics and camp operations.

The reformer used in this invention comprises any reformer of the types described in the following patent publications: U.S. Pat. Nos. 7,976,594; 8,557,189; WO 2004/060546; and US 2011/0061299, incorporated herein by reference. Such a reformer comprises an inlet for feeding a supply of liquid fuel, an inlet for feeding a supply of oxidant, a mixer where the liquid fuel and oxidant are mixed, a catalytic reaction zone comprising a mesh substrate having one or more catalytic elements supported thereon, and an outlet for exhausting the gasified reformate. Details of the reformer are presented hereinafter; additional details are found in the aforementioned references.

According to the process of the invention, the liquid fuel is fed into the reformer, preferably the mixer unit, via any known method, for example, via a nozzle, atomizer, vaporizer, injector, mass flow meter, or any other suitable flow control device. An injector can also be used to quantify or meter the liquid fuel to the reformer. Likewise, the oxidant is fed into the mixer via any known method, for example, via a nozzle, injector, or orifice, and controlled by a mass flow meter or other means. The mixer can further comprise swirler vanes and baffles to facilitate atomization and mixing of the liquid fuel and oxidant. One preferred mixer system comprises a pulsed electromagnetic liquid fuel injector and a pulsed oxidant injector, which feed fuel and oxidant, respectively, into an atomizer that thoroughly atomizes the liquid fuel and mixes it with the oxidant. This combined dual injector-atomizer device is described in U.S. Pat. No. 8,439,990, incorporated herein by reference.

The liquid fuel is typically fed to the mixer at ambient temperature without preheating. The oxidant is generally fed into the mixer at the same temperature as the liquid fuel, but can be fed at a temperature hotter or colder as desired. In one embodiment, the oxidant is fed to the mixer at ambient temperature, i.e., the same temperature as the liquid fuel. In another embodiment, the oxidant is preheated prior to being fed into the reformer. Heat generated in the catalytic reaction zone (i.e., at the substrate) is sufficient to support fuel vaporization at a level required for stable partial oxidation throughout the substrate. As a consequence, the reformer and reforming process of the present invention provide gasification of liquid fuel without a requirement for supplying external heat or steam to the reformer.

The catalytic reaction zone of the reformer comprises a mesh substrate (FIGS. 2 & 3/19) disposed therein onto which a catalyst is supported, such substrate configured to provide thorough mixing of the fuel and oxidant passing there through. As used herein, the term "mesh" refers to a reticulated screen or net-like structure, which is a substantially two-dimensional structure such that one dimension is significantly shorter than the other two dimensions. Generally, the substrate comprises a metal or ceramic mesh, such as a metallic or ceramic net or screen comprising a plurality of pores or channels. The substrate material of construction comprises any metallic or ceramic material capable of withstanding the temperature at which the reformer operates. Suitable metallic materials include without limitation stainless steel and nickel-chromium alloys of acceptable temperature durability. The term "ceramic" refers to inorganic non-metallic solid materials with a prevalent covalent bond including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of ultra-short-channel-length ceramic mesh comprising woven silica, both patents incorporated herein by reference. In one embodiment the mesh substrate is suitably provided in a coiled configuration of cylindrical shape having an inner diameter and a larger outer diameter, such that reactants flowing there through move along a radial flow path from an inlet at the inner diameter to an outlet at the outer diameter. The mesh substrate provided in coiled configuration provides for a plurality of void volumes in random order, that is, empty spaces with essentially no regularity along the flow path from inlet to outlet.

In a preferred embodiment, the substrate comprises a Microlith® brand ultra-short-channel-length mesh substrate, available from Precision Combustion, Inc., North Haven, Conn., USA. A description of the ultra-short-channel-length metal mesh substrate is found, for example, in U.S. Pat. No. 5,051,241, incorporated herein by reference. Generally, the mesh comprises ultra-short-channel-length, low thermal mass metal or ceramic monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths greater than about 5 mm (0.20 inch) upwards of 127 mm (5 inches). The term "channel length" is taken as the distance along a pore or channel measured from an inlet to an outlet of the channel or pore. In the case of the mesh substrate of this invention, the channel length refers to the ultra-short distance from an inlet on one side of the mesh to an outlet on the other side of the mesh, which is distinguished from and not to be confused with the overall length of the radial flow path from the inlet at the inner diameter to the outlet at the outer diameter of the coiled mesh. In another embodiment, the channel length is not longer than the diameter of the mesh elements from which the substrate is constructed; thus in this embodiment, the channel length ranges from 25 μm (0.001 inch) up to about 100 μm (0.004 inch), and preferably not more than about 350 μm (0.012 inch). In view of the ultra-short channel length, the contact time of fuel and oxidant reactants with the mesh advantageously ranges from about 5 milliseconds (5 msec) to about 350 msec. The Microlith® brand ultra-short-channel-length mesh substrate typically comprises from about 100 to about 1,000 or more flow channels per square centimeter. Microlith® brand catalyst substrates can be in the form of woven screens, pressed screens; or they can be manufactured by perforation and expansion of a thin metal sheet as disclosed in U.S. Pat. No. 6,156,444, incorporated herein by reference; or manufactured by 3D printing or by a lost polymer method.

The Microlith® brand ultra-short-channel-length mesh substrate facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh substrate of this invention avoids boundary layer buildup. Since heat and mass transfer coefficients depend on boundary layer thickness, avoiding boundary layer buildup enhances transport properties. The advantages of employing the ultra-short-channel-length mesh substrate, such as the Microlith® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. Among other advantages, the preferred Microlith® brand substrate provides for light-weight portable size, a low pressure drop, a high throughput, a high yield of hydrogen-containing reformate, a low yield of coke and coke precursors, and an acceptably long catalyst lifetime, as compared with prior art substrates.

The mesh substrate supports a reforming catalyst capable of facilitating partial oxidation reactions, wherein a liquid hydrocarbon fuel is reformed to a partially-oxidized reformate product, namely synthesis gas comprising hydrogen and carbon monoxide. Where air is employed as an oxidant, nitrogen will be carried into the reformate. A suitable reforming catalyst comprises one or more of the metals of Group VIII of the Periodic Table of the Elements. The Group VIII elements include iron, cobalt, nickel, ruthenium, rhodium, palladium, osmium, iridium, platinum, and mixtures thereof. The deposition of the Group VIII metal(s) onto the substrate can be implemented by methods well known in the art. Alternatively, finished catalysts comprising Group VIII metal(s) deposited and bound to the Microlith® brand ultra-short-channel-length mesh substrate can be purchased from Precision Combustion, Inc., North Haven, Conn.

The reforming process operates at a temperature greater than about 700° C. and less than about 1,100° C. For the purposes of this invention, the operating pressure ranges from about 1 psig or less, for example, from about 0.5 psig (3.5 kPa) to about 1 psig (6.9 kPa). The combined flow of liquid fuel and oxidant into the reformer is provided to produce an acceptable conversion of fuel to synthesis gas.

The gaseous reformate exiting the reformer comprises hydrogen, and typically also carbon monoxide, and will comprise nitrogen when air is employed as the oxidant.

Since the reformer is run fuel-rich, the oxidant, preferably oxygen, is typically not detectable in the gaseous reformate. If a small quantity of oxygen should be present in the reformate, that quantity of oxygen is well less than the lower limit of oxidant used in premix conditions, that being less than 20 percent, preferably, less than 10 percent and lower, of the stoichiometric ratio required for complete combustion. The reformate is typically characterized by a Wobbe Index greater than about 145 BTU/scf (5.4 MJ/Nm$^3$), preferably, equal to or greater than about 190 BTU/scf (7.1 MJ/Nm$^3$). Likewise, the reformate is characterized by a Wobbe Index typically less than about 700 BTU/scf (26.0 MJ/Nm$^3$), preferably, less than about 325 BTU/scf (12.1 MJ/Nm$^3$), more preferably, equal to or less than about 250 BTU/scf (9.3 MJ/Nm$^3$).

In the apparatus of this invention, there is no necessity to provide a bank of storage vessels to store the reformate until called for by the burner. Instead, the gaseous reformate is produced on demand and fed directly into the burner in accordance with the apparatus design of this invention.

The connecting member, which structurally comprises any conventional conduit, pipe, or flow path capable of transporting a fluid, functions to transfer the gaseous reformate exiting the reformer into the gas-fired burner. In this regard, the connecting member should be constructed from a material sufficient to withstand the temperature of the gaseous reformate, such materials to include without limitation steel, stainless steel, aluminum, iron-chromium-nickel alloys, brass, and any heat-resistant ceramic, such as alumina and silicon nitride. Where the inlet to the burner and other burner parts are not sufficiently heat resistant to withstand the high temperature of the reformate, in one exemplary embodiment the heat-sensitive part(s) are replaced with a more heat resistant material. Alternatively, in another exemplary embodiment, the temperature of the reformate is reduced prior to entry to the burner. In this instance, the connecting member is integrated into a conventional heat exchanger as known to the skilled person, such that heat of reaction inherent to the reformate passing through the connecting member is transmitted into a heat exchange fluid, thereby cooling the reformate before it contacts heat sensitive burner parts.

In another embodiment, with reference to FIG. 3, additional liquid fuel and oxidant are co-fed into the reformate prior to its entry into the burner. Adding extra fuel to the reformate (referred to as "co-fueling" or "fuel augmentation") increases the energy density of the fuel and thereby boosts the energy output of the burner. For this purpose, the connecting member is additionally fitted with a first auxiliary inlet 45 to input a liquid co-fuel and a second auxiliary inlet 49 to input additional oxidant. In this embodiment the oxidant inlet(s) on the burner can be either open or closed; but preferably, they are closed, meaning plugged off. The closed design offers better control over the total flow of auxiliary oxidant fed to the burner; additionally reformate is blocked from leaking out of the burner system. Preferably, the liquid co-fuel is selected from the liquid fuels specified hereinbefore. More preferably, the liquid co-fuel is the same liquid fuel as that fed to the reformer. When employing the first auxiliary inlet to feed liquid co-fuel, it is necessary to vaporize the liquid co-fuel as it enters the gaseous reformate stream within connecting member 35. Towards this end, the first auxiliary inlet 45 is fitted at the inlet to the connecting member 35 with a heat-conductive mesh 47 that allows for distribution of the liquid co-fuel over the surface of the mesh, thereby increasing surface area of the liquid co-fuel and facilitating its vaporization.

Preferably, the heat-conductive mesh 47 comprises a metal or metal alloy sufficiently durable to withstand the temperature of the reformate. The term "heat-conductive" means that the mesh 47 is capable of transferring heat from a point of entry to other points throughout the mesh. Metals typically are heat-conductive; therefore, the mesh is preferably selected from stainless steel, a nickel-steel alloy, a nickel-chromium alloy (for example, Inconel® nickel-chromium), or any other heat resistant alloy. The mesh itself comprises a net-like structure comprised of a web of metallic wires, threads, or fibers in-between which are a plurality of openings, i.e., void spaces. The mesh can be fabricated as a monolithic metal net, a non-woven mat, or fabricated from a plurality of metal elements woven or brazed together. The diameter of the threads, fibers, or wires advantageously ranges from about 0.0005 inch (12.7 µm) to about 0.02 inch (508 µm). The openings or void spaces between the threads, fibers, or wires can take any shape including, for example, square, rectangular, circular, elliptical, diamond, or hexagonal, and any suitable size, preferably, ranging from about 0.0007 inch to about 0.020 inch (17.8 µm to about 508 m) in length, diameter, or longest dimension. The mesh can be provided as a substantially flat surface (screen), or alternatively, in any other appropriate shape, for example, a circular band, a dome, a bowl, a donut, or a stack of donuts. The mesh 47 functions to break-up the liquid co-fuel into smaller droplets and disperse the droplets via wicking over the mesh surface to facilitate vaporization and ignition. Heat-conductive meshes are commercially available from McMaster-Carr, Robinsville, N.J.

Even as the mesh 47 facilitates vaporization, heat is required to vaporize the liquid co-fuel. During start-up of the burner system, heat can be provided via the supplemental igniter 94, such as a glow plug or spark plug, disposed within the connecting member 35 in proximity to the first 45 and second 49 auxiliary inlets. If start-up from cold conditions produces smoke, soot, or coking from unconverted hydrocarbons exiting the reformer or from the liquid co-fuel itself, the ignition device 94 within the connecting member 35 can be used to ignite a flame within the connecting member, which functions to clean-up the fuel stream to the burner and reduce smoke and transient emissions. Additionally, the flame can be used to speed the system start-up. It is not desirable, however, to power the ignition device 94 within connecting member 35 continuously during steady state operation; therefore, the ignition device 94 disposed within the connecting member 35 is typically de-energized once the flame is ignited at the burner.

More specifically, with respect to FIG. 3, an essentially clean, smokeless start-up is effected by initiating at ambient conditions the flow of liquid fuel 13 and the flow of oxidant 15 to the reformer 18 to generate the reformate, which exits the reformer at reformer outlet 25 and then passes into connecting member 35. Thereafter, a second supply of oxidant is fed through the auxiliary oxidant inlet 49 so as to premix with the reformate within the connecting member 35 in a lean ratio of the reformate to the second supply of oxidant. Optionally, a supply of auxiliary fuel is fed through the auxiliary fuel inlet 45, or not fed as desired. The premixed reformate and second (auxiliary) supply of oxidant mixed in connecting member 35 are thereafter ignited via ignition device 94, thereby providing for a clean, essentially smokeless combustion and warm-up of burner components. Combustion products proceed to exhaust at the burner orifice 60. During this start-up procedure, as another option, the igniter 90 at the burner orifice 60 is switched on and off to ensure complete combustion of any traces of uncombusted material at orifice 60. Once the burner apparatus and gas flows are sufficiently heated, a transition from start-up to steady-state conditions is effected. The flow of auxiliary oxidant 49 is diminished, and in one option essentially turned off; and the reformate now in an essentially non-premixed condition flows through the connecting member 35 to orifice 60 of the burner. At orifice 60, the reformate together with ambient air burns in a diffusion flame condition. At this point, the reformate may be sufficiently hot to auto-ignite; however, in another embodiment igniter 90 is sparked once or intermittently energized to ensure complete and stable combustion of the reformate at burner orifice 60.

It should be mentioned that the term "lean ratio of the reformate to the second supply of oxidant" refers to a ratio wherein a quantity employed of the second (auxiliary) supply of oxidant exceeds the quantity needed to burn to completion the combustible components of the reformate, such components including hydrogen and carbon monoxide and any unconverted hydrocarbon components of the liquid fuel.

The transition from start-up operation to steady-state operation is initiated at a predetermined temperature or time that is experimentally correlated with onset of a self-sustaining smokeless combustion of the reformate to carbon dioxide and water. Temperature is measured conventionally with a thermocouple disposed within or on an exterior location of the connecting member 35 or disposed at the burner orifice 60. The predetermined time is measured with a conventional time detector, measuring from the time at which cold start begins, that is, when the reformer starts. Smoke detection can be observed visually or with an opacity meter or flame analyzer. Carbon build-up is a clear indication of incomplete combustion and smoking. A yellow flame or a flickering sooty yellow flame indicates an unacceptable production of smoke, soot, and hydrocarbons emissions. A stable blue flame, further augmented with essentially no soot, typically indicates an acceptable smokeless combustion.

During steady state operation of the burner, heat for vaporization of the liquid co-fuel is preferably acquired from a source other than the ignition device 94. Where the heat is derived depends upon where in the connecting member the first and second auxiliary inlets are positioned. If the first auxiliary inlet (FIG. 3/45) is disposed nearer to the outlet 25 of the reformer 18, heat for vaporization of the liquid co-fuel is obtained from the heated reformate stream exiting the reformer. If the first auxiliary inlet (FIG. 3/45) is disposed nearer to the inlet 40 of the burner 30, or if the outlet end of connecting member 35 is itself positioned within burner 30, then heat for vaporization is obtained not only from the reformate but also from heat of combustion within the burner. A flame within connecting member 35 also provides heat for vaporization of the liquid co-fuel.

It should be appreciated that the quantity of liquid co-fuel, if employed, relative to quantity of gaseous reformate fed to the burner affects the performance of the burner. Generally, when running in fuel augmentation mode, the quantity of liquid co-fuel fed at inlet 45 is greater than 2 percent, preferably, greater than about 5 percent, more preferably, greater than about 20 percent, and even more desirably greater than about 30 percent, by weight, based on the total weight of the fuel fed to the burner, the total fuel to include gaseous reformate and liquid co-fuel. Generally, the quantity of liquid co-fuel fed at inlet 45 is less than about 75 percent, preferably, less than about 70 percent, by weight, based on the total weight of the fuel fed to the burner. The quantity of auxiliary oxidant added to the connecting member at the co-fueling stage (inlet 49) is sufficient to maintain an acceptable, and preferably, high quality flame at the burner head, optimally, a stable blue flame. All unconverted hydrocarbons and partially converted combustion products are fully combusted at the orifice(s) of the burner in a diffusion flame combustion, which draws the required balance of oxidant air from ambient environs.

The burner employed in this invention comprises any gas-fired burner designed for static, heat-producing purposes, such as the burners employed in well-known commercial appliances, non-limiting examples of which include gas-fired burners adapted to a stove, oven, range, grill, griddle, stock pot burner, clothes dryer, hot water heater, or boiler. Other suitable gas-fired burners include those used in incinerators. Such gas-fired burners operate on fuels existing in a gaseous state of matter at standard atmospheric temperature and pressure, such fuels exemplified by methane, natural gas, ethane, propane, and butane. Gas-fired burners of this type are designed and configured for a specific fuel having a specified range of Wobbe Index. As mentioned before, natural gas has a Wobbe Index ranging from about 1,250 to 1,440 BTU/scf (44.6-53.6 MJ/Nm$^3$); whereas the Wobbe Indices for propane and butane are typically about 1,882 BTU/scf (70.1 MJ/Nm$^3$) and about 2,251 BTU/scf (83.8 MJ/Nm$^3$, plus or minus about 100 BTU/scf (+/−3.7 BTU/scf) depending upon geographic origin of the gaseous resource. Accordingly, the gas-fired burners suitable for this invention more generically encompass burners designed for a broad range of Wobbe Index from about 1,250 to about 2,300 BTU/scf (46.6-85.7 MJ/Nm$^3$). Such burners are commercially available from Viking Range, L.L.C., Greenwood, Miss. among other suppliers.

The gas-fired burner employed in this invention typically comprises an inlet configured to input the gaseous fuel, one or more inlets to input a portion of the oxidant, typically through a venturi design, and one or more orifices at which the gaseous fuel is ignited and combusted in a premixed diffusion flame. In a first embodiment, the burner is not enclosed by a housing, such that the balance of oxidant required for complete combustion of the fuel is supplied via diffusion of ambient air in the environs of the one or more orifices. In this first embodiment, combustion products exhaust into the environment. In another embodiment, the burner is enclosed within a burner housing. In this embodiment, the balance of oxidant required for complete combustion is supplied via diffusion from the surrounding environment through an inlet in the housing; and a combustion product stream exhausts via an outlet in the housing, as shown for example in FIG. 1 (8). The mixture of gaseous reformate and oxidant is ignited with a conventional pilot device positioned near each burner orifice, as is known for commercial gas-fired burners.

As noted hereinabove and in FIG. 1 (5), commercial partially-aerated burners are manufactured with one or more inlets for feeding oxidant into the burner, so as to premix the gaseous fuel and oxidant prior to ignition. The premix oxidant ("primary oxidant") is often drawn through a venturi by means of entrainment by high velocity fuel flow through the inlet of the burner, which generates a low pressure region located adjacent to the primary oxidant inlet. The oxidant inlet generally comprises an adjustable valve comprising shutters or louvers, so as to control the quantity of oxidant entering the burner. Even when the valve is completely turned down, typically a small portion of air can still enter the burner due to manufacturing tolerances. As mentioned hereinbefore, for this invention it is desirable for each valve at the burner oxidant inlet to be removed and replaced with a solid tight-fitting plug that blocks essentially all air from entering the burner through the adjustable valve. Compare, for example, prior art shown in FIG. 1 having oxidant inlet(s) 5 in burner 3 versus (a) the invention as illustrated in FIG. 2 having no oxidant inlet drawing oxidant into connecting member 35 or within burner 30, or (b) the invention as illustrated in FIG. 3 having a controllable auxiliary oxidant inlet 49 drawing oxidant into connecting member 35, however with no oxidant inlet into burner 30.

The materials of construction of the reformer, burner, connecting member, inlets and outlets, and any other individual components of the apparatus of this invention are suitably comprised of any material of construction capable of withstanding the temperature and chemicals to which the part is to be exposed. Suitable non-limiting materials of construction include steel, stainless steel, aluminum, iron-chromium-nickel alloys, and brass. All inlets and outlets are of conventional design as known in the art. The one or more orifices of the burner are typically designed for specific velocity of gases flowing there through, so as to provide a stable flame speed and propagation and to prevent unstable flame blow-off or suck-in.

The following embodiments are presented as illustrations of the invention; however, the invention should not be limited thereto.

Embodiments

Example 1 (E-1)

A reformer to be employed in an apparatus and method of this invention was evaluated to understand the Wobbe Index of a gaseous reformate produced. The reformer was sized for a 5 $KW_{th}$ input of JP-8 liquid fuel. Accordingly, the reformer was comprised of a Microlith® brand metal mesh substrate onto which a rhodium-based catalyst was supported (Precision Combustion, Inc., North Haven, Conn.). The metal mesh was rolled into a cylindrical coiled configuration and positioned within a closed reformer housing containing an inlet for feeding a supply of liquid fuel, an inlet for feeding a supply of air, and an outlet for exhausting a catalytic partial oxidation product stream comprising carbon monoxide and hydrogen. A glow plug was positioned within the inner diameter of the coil for aiding in the vaporization of the liquid fuel. As a general procedure the glow plug was energized; a flow of liquid fuel was initiated; then a flow of air was initiated in a fuel-rich ratio of fuel to air, specifically, 0.80/1 to 0.95/1. The flows of fuel and air were directed axially into the inner diameter of the coiled mesh; and then the flows passed radially from the inner diameter to the outer diameter of the coil before exiting the housing. Once the catalytic coil reached a temperature sufficient to maintain catalytic partial oxidation of the fuel, the glow plug was de-energized.

Figure 4:
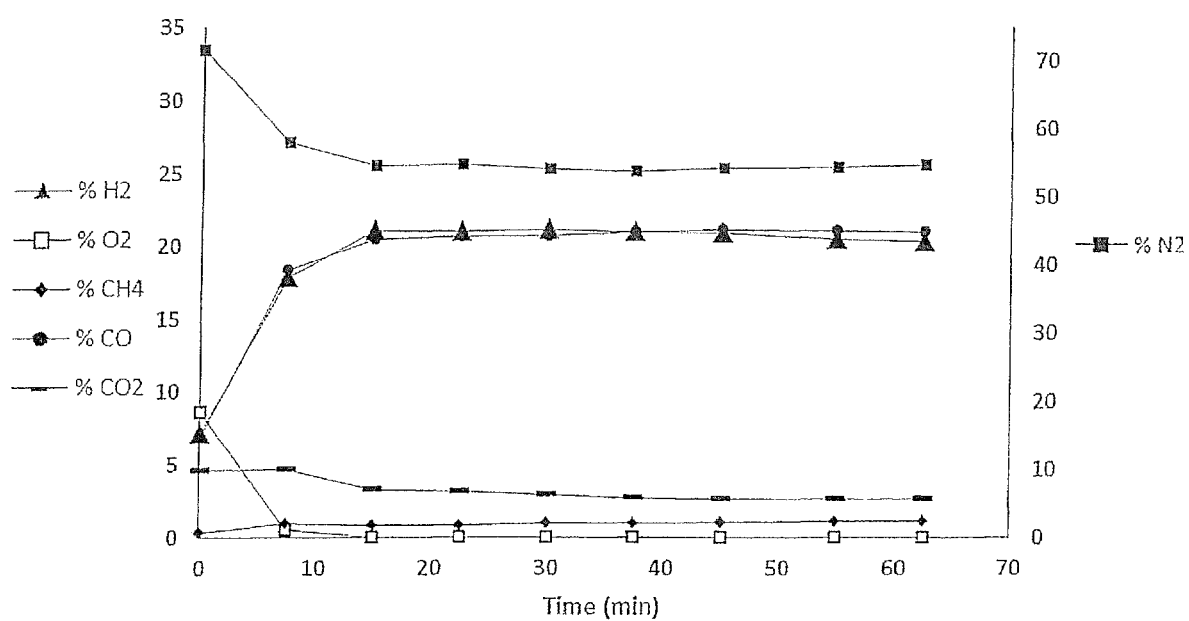
FIG. 4 illustrates a graph plotting composition of a gasified JP-8 fuel as a function of time in a reforming process adaptable to the apparatus and method of this invention.

The composition of the exhaust stream was analyzed using gas chromatography. Results over the first 60 minutes of operation are shown in FIG. 4, with the first few points up to 10-15 minutes illustrating start-up. As seen, the exhaust consisted mainly of nitrogen, hydrogen and carbon monoxide. Based on the composition of the exhaust stream, a Higher Wobbe Index was calculated using the Equation hereinabove, where the specific gravity of the fuel was taken as the density of the exhaust gas composition as compared to the density of air, the latter taken as 1.2 g/ml at 20° C. and 101 kPa. At steady state the composition of the gasified reformate equated to a Higher Wobbe Index in a range from about 203 BTU/scf to 236 BTU/scf. Table 1 illustrates the composition of the gaseous reformate at a variety of fuel flows ranging from 3.0 g/min to 8.9 g/min.

The Higher Wobbe Index for typical natural gas, with higher heating value of 1,040 BTU/scf (38.8 $MJ/Nm^3$) and specific gravity of 0.6, was calculated to be 1,343 BTU/scf (50.1 $MJ/Nm^3$). By comparison, the Wobbe Index for the syngas reformate produced in the reformer was evaluated to range from 15 to 18 percent of that for natural gas.

TABLE 1

Reformate Composition for 5 $KW_{th}$ Reformer

| Fuel g/min | Thermal Input BTU/hr (KJ/hr) | $H_2$ | $O_2$ | $N_2$ | $CH_4$ | CO | $CO_2$ | $C_2H_4$ | $C_2H_6$ | $C_3H_6$ | $C_3H_8$ | Higher Wobbe Index BTU/scf ($MJ/Nm^3$) |
|---|---|---|---|---|---|---|---|---|---|---|---|---|
| 3.0 | 7,438 (7,847) | 17.6 | $ND^1$ | 55.4 | 1.39 | 20.6 | 2.90 | 1.44 | 0.17 | 0.474 | 0.0009 | 203.3 (7.6) |
| 5.0 | 12,386 (13,067) | 20.0 | $ND^1$ | 52.5 | 1.60 | 20.8 | 3.17 | 1.35 | 0.17 | 0.395 | 0.0004 | 214.8 (8.0) |
| 7.1 | 17,368 (18,323) | 22.3 | $ND^1$ | 50.1 | 1.43 | 22.2 | 2.39 | 1.07 | 0.18 | 0.326 | 0.0002 | 222.8 (8.3) |
| 8.9 | 21,872 (23,075) | 18.9 | $ND^1$ | 52.6 | 1.81 | 21.7 | 2.06 | 2.10 | 0.22 | 0.546 | 0.0030 | 235.6 (8.8) |

[1]ND = not detectable.

Example 2 (E-2)

A reformer was constructed and operated in a manner similar to the one described in Example 1, with the exception that the reformer was sized for a liquid fuel input of 14 $KW_{th}$. Likewise, a Microlith® brand metal mesh substrate (Precision Combustion, Inc.) was employed, shaped into a cylindrical coiled configuration having an inner diameter and an outer diameter and a rhodium catalyst supported thereon. The composition of the exhaust stream was analyzed using gas chromatography. The exhaust consisted mainly of nitrogen, hydrogen and carbon monoxide. Based on the composition of the exhaust stream, a Higher Wobbe Index was calculated using the Equation hereinabove, where the specific gravity of the fuel was calculated as the density of the exhaust gas composition versus the density of air, the latter taken as 1.2 g/ml at 20° C. and 101 kPa. Table 2 illustrates the composition of the gaseous reformate at a variety of fuel flows ranging from 6 g/min to 20 g/min.

As seen, the composition of the gasified fuel at steady state conditions equated to a Higher Wobbe Index between 199 and 223 BTU/scf (7.4-8.3 MJ/Nm$^3$). By contrast, the Higher Wobbe Index for natural gas is about 1,343 BTU/scf (50.1 MJ/Nm$^3$). By comparison, the Wobbe Index for the syngas reformate of E-2 was evaluated as only 15 to 17 percent of that for natural gas.

Despite the differences found in E-1 and E-2 between the Wobbe Index of the reformate and that of natural gas, the reformate was surprisingly found to be a suitable substitute for use in a natural gas appliance, as illustrated in the examples hereinbelow.

Figure 5:
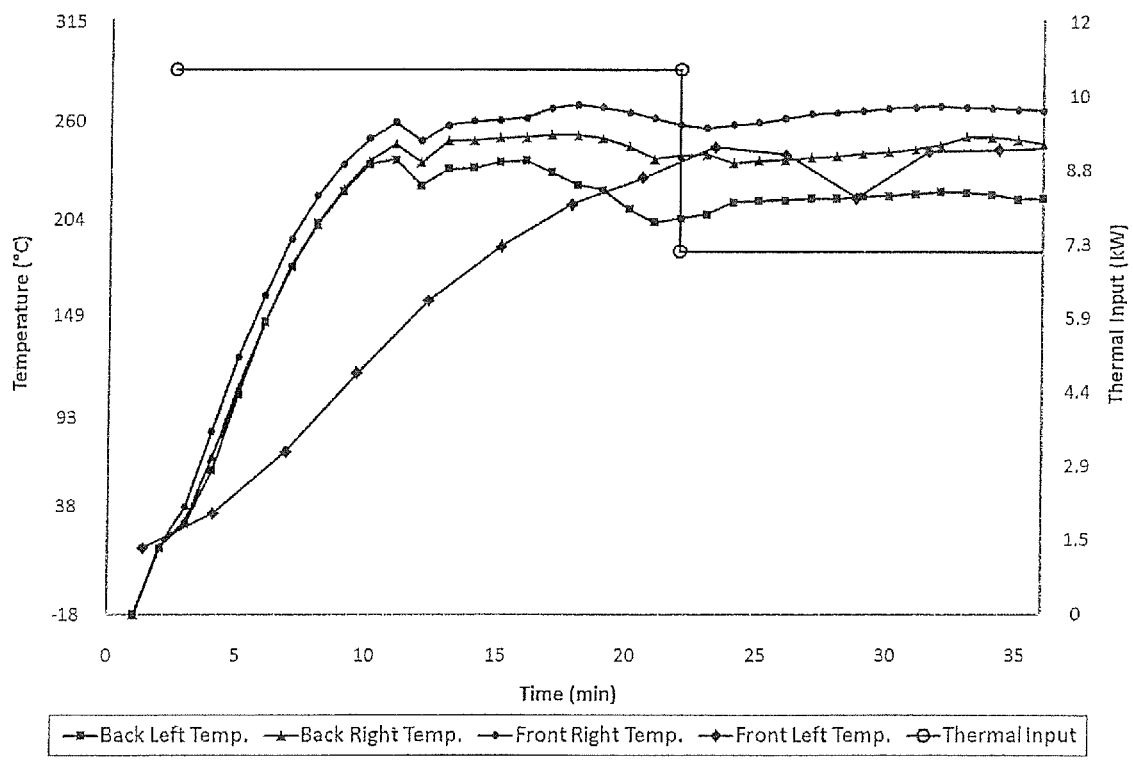
FIG. 5 illustrates a graph plotting temperature as a function of time in an apparatus and method of this invention, wherein a natural-gas fired griddle is operated on liquid JP-8 fuel.

The reformer was fed with liquid JP-8 fuel and air and operated as described in Example 2 hereinabove to produce syngas reformate, which was combusted in the griddle burner in a non-premixed diffusion flame. The additional air needed for full combustion of the reformate fed to the burner was obtained from ambient air in the vicinity of the burner orifices. FIG. 5 illustrates a graph of surface temperature of the griddle as a function of time.

The griddle burner was lit with the burner igniter once the reformate reached a thermal input of 36,600 BTU/hr (38,613 KJ/hr). The system was maintained at 36,600 BTU/hr for 20 minutes as the griddle surface warmed up, after which the system was transitioned to 24,400 BTU/hr (25,742 KJ/hr). With no load on the griddle surface, its temperature steadied out at an average of 249° C. (480° F.). While this tempera-

TABLE 2

Exhaust Gas Composition for 14 kW$_{th}$ Reformer

| Fuel (g/min) | Thermal Input BTU/hr (KJ/hr) | Reformate Composition (mole % dry basis)[1] ([1]ND = not detectable) | | | | | | | | | | Higher Wobbe Index BTU/scf (MJ/Nm$^3$) |
|---|---|---|---|---|---|---|---|---|---|---|---|---|
| | | H$_2$ | O$_2$ | N$_2$ | CH$_4$ | CO | CO$_2$ | C$_2$H$_4$ | C$_2$H$_6$ | C$_3$H$_6$ | C$_3$H$_8$ | |
| 6 | 14,740 (15,551) | 14.38 | ND[1] | 59.02 | 1.97 | 18.20 | 3.70 | 1.87 | 0.21 | 0.637 | ND[1] | 198.8 (7.4) |
| 7 | 17,197 (18,143) | 16.06 | ND[1] | 56.91 | 1.80 | 19.71 | 3.25 | 1.60 | 0.18 | 0.500 | ND[1] | 201.2 (7.5) |
| 8 | 19,654 (20,735) | 16.96 | ND[1] | 55.45 | 1.95 | 20.28 | 2.84 | 1.76 | 0.20 | 0.562 | ND[1] | 215.0 (8.0) |
| 11 | 26,810 (28,285) | 24.21 | ND[1] | 49.02 | 0.92 | 23.45 | 1.87 | 0.43 | 0.09 | ND[1] | ND[1] | 208.3 (7.8) |
| 17 | 41,433 (43,712) | 22.61 | ND[1] | 49.99 | 1.31 | 22.41 | 2.03 | 1.46 | 0.19 | ND[1] | ND[1] | 222.8 (8.3) |
| 19 | 46,308 (48,855) | 21.23 | ND[1] | 51.25 | 1.36 | 21.95 | 2.15 | 1.87 | 0.20 | ND[1] | ND[1] | 222.4 (8.3) |
| 20 | 51,394 (54,221) | 20.63 | ND[1] | 51.84 | 1.37 | 21.82 | 2.15 | 2.00 | 0.20 | ND[1] | ND[1] | 221.4 (8.3) |

Example 3 (E-3)

A griddle (Vulcan 24 RRG), designed for operation on natural gas, was connected to a reformer in accordance with this invention and operated on liquid distillate fuel. The griddle as obtained commercially comprised a standard gas burner closely similar to the type shown in FIG. 1, comprising the burner 3, an inlet 4 for feeding a supply of gaseous fuel, an inlet 5 for feeding air into premixture with the fuel, and a U-shaped tube comprised of a plurality of orifices 6 at which combustion occurred. The burner did not comprise a housing 20, air inlet 7, or exhaust outlet 8; but rather orifice 6 was simply open to ambient environs. The burner was modified to seal off inlet(s) 5 with a metal plug. By so doing, the griddle burner adopted the design of FIG. 2, illustrating burner 30, fuel inlet 40, and orifice 60.

The griddle so modified was connected to the reformer of Example 2, illustrated in FIG. 2 with reformer body 18, liquid fuel inlet 13, air inlet 15, catalytic reaction zone comprising Microlith® brand metal mesh substrate 19 (Precision Combustion, Inc.) and outlet 25. A connecting member 35, comprised of a stainless steel metal pipe, was connected at its inlet end to the outlet 25 of the reformer and connected at its outlet end to the burner inlet 40. Gaseous reformate exiting the reformer at outlet 25 was fed into the connecting member 35, and thence directly, without premixing air, into inlet 40 of griddle burner 30. No air was premixed with the gaseous reformate.

ture is relatively high for many cooking applications, the surface temperature fell when a thermal load was placed on the griddle. If necessary, the thermal input can be increased to about 49,000 BTU/hr (51,695 KJ/hr) to maintain a target temperature while cooking. Throughout the test, a stable blue flame was observed as the commercial gas-fired griddle was operated on liquid distillate fuel.

Example 4 (E-4)

An embodiment of the apparatus of this invention was constructed from a reformer comprising a Microlith® brand ultra-short-channel-length metal mesh substrate, as detailed in Example 1, and a commercial gas-fired stock-pot burner (Radiance Corporation, TAST-18S stockpot burner) designed for operation on natural gas. The stock-pot burner was constructed with an inlet for feeding the natural gas, an inlet for feeding air, and a plurality of orifices where combustion occurred. The connection between the reformer and the burner was made in accordance with the design of FIG. 2; wherein gaseous reformate exiting the reformer 18 was fed into connecting member 35 and directly therefrom to the fuel inlet of the burner 30. The air inlet of the burner (equivalent of #5, FIG. 1) was plugged, such that no air was premixed with the reformate. The reformer had a maximum fueling capacity of 40,000 BTU/hr (42,200 KJ/hr) of JP-8 fuel. A stock pot filled with water was positioned on top of the burner. The water temperature was conventionally monitored.

The reformer was fueled with liquid JP-8 fuel and operated as in E-2. The gaseous reformate exiting the reformer was ignited and combusted in the burner. A stable blue flame was observed throughout the test. Other test results are summarized in Table 3. As seen, the heat input of the reformate fuel to the stockpot burner was 39,161 BTU (41,315 KJ), of which 21.0 percent was transferred to water in the stock pot.

TABLE 3

Stock-Pot Burner Test Results

| Heat Input | E-4 Reformate BTU (KJ) | CE-1 Natural Gas BTU (KJ) |
|---|---|---|
| Heat Input of Fuel[1] | 39,161 (41,315) | 79,000 (83,345) |
| Heat Input to Water[2] | 8,214 (8,666) | 13,056 (13,774) |
| Burner Efficiency | 21.0% | 16.5% |

[1]Calculated on Lower Heating Value and quantity of JP-8 fuel fed to reformer.
[2]Calculated on weight of water, specific heat of water, and rise in temperature of water.

Comparative Experiment 1 (CE-1)

For comparative purposes, the stock pot burner (Radiance brand TAST-18S) of Example 4 was operated on natural gas in the manner intended by the manufacturer. Specifically, the burner was constructed as in FIG. 1 with a fuel inlet 4 and conventional air regulating louvers 5 through which natural gas and air, respectively, were input and premixed. The mixture of natural gas and air was burned conventionally in burner 6; and heat generated from the burner was used to raise the temperature of a stock pot of water identical to the one used in Example 4. As expected, under natural gas operation, a stable blue flame was observed throughout the test. Results are shown in Table 3. As seen, the heat input from operation with natural gas was 79,000 BTU (83,345 KJ), of which 16.5 percent of the heat input was employed to raise the temperature of the water.

When E-4 was compared with CE-1, it was seen that the heat input from natural gas fed to the burner was twice the heat input from reformate fed to the burner. This result, however, relates to the fact that heat output from the reformer was limited by the size of the reformer. A larger reformer would allow for a higher throughput of fuel and a higher output of heat. More importantly, the burner efficiency (21.0%) of the apparatus of the invention (E-4) operating on syngas reformate compared favorably with the burner efficiency (16.5%) when the burner was operated on natural gas.

Example 5 (E-5)

A commercial tankless hot water heater designed for conventional operation on natural gas was modified and operated in accordance with this invention. The commercial tankless hot water heater (Marey Heater Corp. Model PowerGas 5L NG) comprising a natural gas-fired burner was connected to the reformer of Example 4 in the manner illustrated in FIG. 2. The fuel inlet 40 of the burner 30 was drilled out to a larger diameter to accommodate the reformate flow from the reformer 18. An air inlet (equivalent of #5, FIG. 1) into the burner was plugged up such that no air was premixed with the reformate entering the burner. No other modifications were made to the controls of the burner. The reformer was started up as detailed in Example 4; and the reformate exiting the reformer was fed via connecting member 35 directly without any premixed air into the burner of the tankless hot water heater. A stable blue flame was observed throughout the test. The tankless hot water heater was operated successfully on syngas reformate as an alternative to natural gas.

Example 6 (E-6)

A commercial natural gas clothes dryer appliance is adapted with a catalytic liquid fuel reformer in the manner shown in FIG. 2; and the resulting apparatus is operated in accordance with this invention. The reformer is constructed and operated similarly to the one used in Example 4 hereinabove. The reformer is started up on JP-8 fuel; and the syngas reformate of low Wobbe Index exiting the reformer is fed directly without any premixed air into the burner of the clothes dryer. No modifications are made to the controls of the dryer, other than that the air inlet into the burner is plugged up such that no air is premixed with the syngas reformate. A stable blue flame is observed throughout the test.

The reformate-fired clothes dryer of this invention saves significant fuel consumption as compared to currently fielded electric dryers. As an example, consider a remotely-located Containerized Batch Laundry Unit (CBL) equipped with two commercial electric dryers, where each dryer requires 30 kWe to create hot air and to operate tumbler rotation and controls. This necessitates a 60 kWe generator with 58 kWe used for hot air generation. Based on roughly 31 percent efficiency for electrical generation, 16 kg of JP-8 fuel must be provided per hour to the generator to generate the hot air electrically.

The embodiment of this example provides for a JP-8 liquid fueled dryer for generating the hot air, replacing the 60 kWe generator with a 2 kWe generator and a 96 kWth reformer, and reducing the JP-8 requirement to 8 kg/hr, a 50 percent fuel saving. In a typical 600 person camp, dryers operate 15 hours a day. This invention reduces JP-8 consumption by 111 kg/day (37 gal/day) and eliminates the need for the larger 60 kWe generator. Additionally, the approach enables operation of commercial gas dryers on JP-8 fuel, minimizing retrofitting, acquisition and maintenance costs.

Using basic assumptions and the dryer manufacturer's specification, a fuel savings of approximately 3.7 kg/hr per dryer can be realized. For every two dryers running at 15 hr/day, a daily savings of 111 kg of fuel (~37 gallons) are realized.

Example 7 (E-7)

A burner system was fabricated in accordance with the invention by connecting a griddle (Vulcan 24 RRG) designed for operation on natural gas to a fuel reformer. With reference to FIG. 3, the commercial griddle comprised a burner 30, a stock igniter 90, a fuel inlet 40, and a U-shaped tube comprised of a plurality of orifices 60 where flame combustion occurred. The combustor was fitted via connecting member 35 to a reformer 18 comprised of a liquid fuel inlet 13, an air inlet 15, catalytic reaction zone comprising Microlith® brand ultra-short-channel-length metal mesh substrate 19 (Precision Combustion, Inc.), and reformate outlet 25. The connecting member 35, comprised of a stainless steel metal pipe, was connected at its inlet end to the outlet 25 of the reformer and connected at its outlet end to the burner inlet 40. The connecting member 35 was fitted with an auxiliary air inlet 49, a liquid distillate co-fuel inlet 45, and a supplemental igniter 94 positioned near the inlets 45/49 for liquid co-fuel and auxiliary air. A metal screen 47 was positioned transversely at the intersection of the liquid co-fuel inlet 45 and connecting member 35 to facilitate heat transfer from hot reformate exiting the reformer, thereby facilitating vaporization of the liquid co-fuel.

The reformer was fed with liquid JP-8 fuel (3.5 g/min) and air and operated under fuel-rich conditions at a temperature ranging from 950° C. to 1,000° C. and at atmospheric pressure to produce syngas reformate exiting the reformer 18 at outlet 25. Liquid JP-8 (7.0 g/min) was co-fueled onto the metal screen 49 where it vaporized and passed into the connecting member 35. (The total fuel flow into the system was 10.5 g/min, of which only 33.33 percent was fuel fed to the reformer and 66.67 percent was liquid co-fuel fed to the connecting member.) Additional air was fed through inlet 49 into the connecting member 35, in a quantity sufficient to maintain a blue flame at the burner orifices 60. The mixture of gaseous reformate, vaporized co-fuel and auxiliary air were fed from the connecting member 35 via inlet 40 into the griddle burner 30. The mixture auto-ignited within the connecting member 35, and the resulting flame within the connecting member 35 facilitated start-up and maintenance of a clean, smokeless flame at the burner orifices 60. Fuel gas samples taken at inlet 40 into the burner 30 were analyzed by gas chromatography with following results: hydrogen, 19.45 percent; nitrogen, 56.34 percent; methane, 0.06 percent; carbon monoxide, 21.60 percent; carbon dioxide, 2.37 percent; and ethane, 0.18 percent, by volume. Concentrations of oxygen, ethylene, propylene, propane, and acetylene at inlet 40 to the burner 30 fell below detectable limits.

Example 8 (E-8)

A natural gas-fired oven was modified and operated in accordance with this invention as follows: With guidance from FIG. 3, an oven (VULCAN Blodgett DFG50) having a burner head 30 designed for operation on natural gas was modified by connection to a fuel reformer 18 via connecting member 35. The burner head 30 was disposed within an oven chamber where cooking occurred. The connecting member 35 and reformer 18 were disposed external to the oven chamber. The reformer comprised a fuel inlet 13, an air inlet 15, and a Microlith® brand ultra-short-channel-length metal mesh substrate 19 (Precision Combustion, Inc.) having a reforming catalyst supported thereon. Inasmuch as the connecting member 35 was short in length, the reformer 18 and burner 30 were closely spaced. Accordingly, only spark igniter 90 at the burner outlet 60 was employed; whereas igniter 94 was not energized.

Starting from ambient temperature (cold condition), a set point temperature for the oven was selected. Then, a flow of air (1.5 standard liters per minute) was started via auxiliary oxidant inlet 49. The spark igniter 90 was energized. A glow plug igniter (not shown) within the reformer 18 was energized, and a flow of JP-8 fuel (2.5 g/min) was initiated into fuel inlet 13 of the reformer 18. Air was fed into the reformer 18 via oxidant inlet 15 at a flow rate sufficient to maintain a steady state catalyst temperature of 920° C. and a fuel-rich fuel/air ratio within the reformer 18. A reformate comprising hydrogen and carbon monoxide having a Wobbe Index between 145 BTU/scf (5.4 MJ/Nm$^3$) and 700 BTU/scf (26.0 MJ/Nm$^3$) exited the reformer at outlet 25 passing into connecting member 35 where it was combusted with the air flow 49 in a fuel-lean fuel/air ratio, thereby resulting in a smokeless cold start within connecting member 35. Combustion products exhausted at the oven outlet 60.

When the oven reached its setpoint temperature, the system was transitioned to steady state operation. The JP-8 fuel flow at reformer inlet 13 was ramped to 3.0 g/min and the air flow at reformer oxidant inlet 15 was adjusted to maintain a reformer substrate temperature between 900° C. and 980° C. Then, the air flow at auxiliary inlet 49 was reduced to near shut-off. Combustion within connecting member 35 was essentially quenched; and a smokeless blue flame was then observed steadily at the burner outlet 60. A feedback loop monitored the actual oven temperature versus the selected oven set point temperature. Respective flows 13 and 15 of fuel and air to the reformer were varied to maintain the selected oven temperature and desired steady state temperature of the reformer. The oven was operated continuously for 2 hours. During the entire operation, no carbon or soot was detected on the oven door or within the oven; and the flame remained steady and blue-colored indicating an essentially smokeless steady state operation on the liquid JP-8 fuel.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of starting-up a gas-fired burner on a liquid fuel, comprising:
    (a) feeding a liquid fuel and a first supply of oxidant into a reformer in a fuel-rich fuel/oxidant ratio, the reformer comprising a mesh substrate having one or more catalytic elements supported thereon;
    (b) contacting the liquid fuel and the first supply of oxidant with the mesh substrate having one or more catalytic elements supported thereon, under reaction conditions sufficient to produce a flow of a gaseous reformate comprising hydrogen, the gaseous reformate having a Wobbe Index greater than about 145 BTU/scf (5.4 MJ/Nm$^3$) and less than about 700 BTU/scf (26.0 MJ/Nm$^3$);
    (c) feeding into a connecting member the flow of the gaseous reformate and a second supply of oxidant in a lean ratio of the reformate to the second supply of oxidant, and energizing an ignition source within the connecting member to initiate combustion of the reformate therein;
    (d) passing combustion products from step (c) from the connecting member into a gas-fired burner configured to receive a gaseous fuel having a Wobbe Index in a range from about 1,250 BTU/scf (46.6 MJ/Nm$^3$) to about 2,300 BTU/scf (85.7 MJ/Nm$^3$) and exhausting the combustion products at one or more orifices of the gas-fired burner; and
    (e) at a predetermined temperature or time, diminishing the second supply of oxidant.

2. The method of claim 1 wherein the liquid fuel fed to the reformer comprises a liquid hydrocarbon derived from fossil fuels, biomass, and synthetic processes including Fischer-Tropsch processes; and the oxidant fed to the reformer is selected from molecular oxygen, mixtures of oxygen and nitrogen, and mixtures of oxygen with an inert gas.

3. The method of claim 1 wherein the liquid fuel fed to the reformer is a liquid distillate fuel selected from the group consisting of kerosene, diesel, JP-8, JP-10, Jet-A, and mixtures thereof; and wherein the oxidant is air.

4. The method of claim 1 wherein the mesh substrate comprises an ultra-short-channel-length mesh substrate having a channel length in a range from 25 microns to 500 microns and having one or more Group VIII elements deposited thereon.

5. The method of claim 1 wherein the mesh substrate is selected from metallic and ceramic meshes.

6. The method of claim 1 wherein the liquid fuel fed to the reformer is diesel or JP-8 and wherein the gas-fired burner is configured to operate on methane or natural gas.

7. The method of claim 1 wherein in step (e) the ignition source disposed within the connecting member is de-energized.

8. The method of claim 1 wherein in step (c) a flame forms within the connecting member; and wherein in step (e) the flame within the connecting member is extinguished upon diminishing the second supply of oxidant.

9. A method of operating a gas-fired burner on a liquid fuel from an essentially smokeless start-up:
  (a) feeding a liquid fuel and a first supply of oxidant into a reformer in a fuel-rich fuel/oxidant ratio, the reformer comprising a mesh substrate having one or more catalytic elements supported thereon;
  (b) contacting the liquid fuel and the first supply of oxidant with the mesh substrate having one or more catalytic elements supported thereon, under reaction conditions sufficient to produce a flow of a gaseous reformate comprising hydrogen, the gaseous reformate having a Wobbe Index greater than about 145 BTU/scf (5.4 MJ/Nm$^3$) and less than about 700 BTU/scf (26.0 MJ/Nm$^3$);
  (c) feeding into a connecting member the flow of the gaseous reformate and a second supply of oxidant in a lean ratio of reformate to second supply of oxidant, and energizing an ignition source within the connecting member to initiate combustion of the reformate therein;
  (d) passing combustion products from step (c) from the connecting member into a gas-fired burner configured to receive a gaseous fuel having a Wobbe Index in a range from about 1,250 BTU/scf (46.6 MJ/Nm$^3$) to about 2,300 BTU/scf (85.7 MJ/Nm$^3$) and exhausting the combustion products at one or more orifices of the gas-fired burner;
  (e) at a predetermined temperature or time, diminishing the second supply of oxidant; and
  (f) passing a continuing flow of gaseous reformate from the reformer through the connecting member into the gas-fired burner; and at one or more orifices of the gas-fired burner, combusting the reformate under diffusion flame conditions.

10. The method of claim 9 wherein the liquid fuel fed to the reformer is selected from liquid hydrocarbons derived from fossil fuels, biomass, and Fischer-Tropsch processes; and the first and second supplies of oxidant are each individually selected from molecular oxygen, mixtures of oxygen and nitrogen, and mixtures of oxygen with an inert gas.

11. The method of claim 9 wherein the liquid fuel fed to the reformer is a liquid distillate fuel selected from the group consisting of kerosene, diesel, JP-8, JP-10, Jet-A, and mixtures thereof; and wherein the first and second supplies of oxidant are air.

12. The method of claim 9 wherein the mesh substrate comprises an ultra-short-channel-length mesh having a channel length in a range from 25 microns to 500 microns and having one or more Group VIII elements deposited thereon.

13. The method of claim 9 wherein the mesh substrate is selected from metallic and ceramic meshes.

14. The method of claim 9 wherein the liquid fuel fed to the reformer is diesel or JP-8; and wherein the gas-fired burner is configured to operate on natural gas.

15. The method of claim 9 wherein at one or more orifices of the burner, the burner comprises a second ignition source; and during steps (c) and (d), the second ignition source is intermittently energized.

16. The method of claim 9 wherein in step (e) the ignition source disposed within the connecting member is de-energized.

17. The method of claim 9 wherein in step (c) a flame occurs within the connecting member; and wherein in step (e) the flame within the connecting member is extinguished upon diminishing the second supply of oxidant.

18. A cooking appliance having as a constituent part a gas-fired burner adapted for operation on a liquid fuel, wherein the system comprises;
  (a) a reformer configured under operative conditions to exhaust a gaseous reformate having a Wobbe Index greater than about 145 BTU/scf (5.4 MJ/Nm$^3$) and less than about 700 BTU/scf (20.0 MJ/Nm$^3$), comprising:
    (i) a housing defining a reforming chamber;
    (ii) a first inlet configured to input a liquid fuel into the reforming chamber;
    (iii) a second inlet configured to input an oxidant into the reforming chamber;
    (iv) a mesh substrate having one or more catalytic metals supported thereon, the mesh substrate being disposed within the reforming chamber and fluidly coupled to the first and second inlets for inputting the fuel and oxidant, respectively; and
    (v) an outlet for exhausting a reformate from the reforming chamber, the outlet being fluidly coupled to the mesh substrate;
  (b) a connecting member comprising an inlet end and an outlet end, wherein the inlet end of the connecting member is fluidly coupled to the outlet of the reformer, and wherein the outlet end of the connecting member is fluidly coupled to an inlet of a gas-fired burner; and
  (c) the gas-fired burner configured to operate with a gaseous fuel having a Wobbe Index in a range from about 1,250 BTU/scf (46.6 MJ/Nm$^3$) to about 2,300 BTU/scf (85.7 MJ/Nm$^3$), the burner comprising;
    (i) the inlet fluidly coupled to the outlet end of the connecting member; and
    (ii) one or more orifices downstream of the burner inlet, the orifices configured to support flame combustion.

19. The cooking appliance of claim 18 wherein the mesh substrate comprises an ultra-short-channel-length mesh substrate having a channel length ranging from 25 microns to 500 microns.

20. The cooking appliance of claim 18 wherein the mesh substrate is selected from metallic and ceramic meshes.

21. The cooking appliance of claim 18 wherein the mesh substrate is provided in a coiled configuration having an inner diameter and an outer diameter and a radial flow path from the inner diameter to the outer diameter, and wherein an ignition source is located within the inner diameter of the coiled configuration.

22. The cooking appliance of claim 18 wherein an ignition source is disposed within the connecting member.

23. The cooking appliance of claim 18 wherein the gas-fired burner further comprises an ignition source at one or more orifices of the burner.

24. The cooking appliance of claim 18 selected from the group consisting of ovens, grills, and griddles.

* * * * *